(12) United States Patent
Kajihara et al.

(10) Patent No.: US 11,435,952 B2
(45) Date of Patent: Sep. 6, 2022

(54) MEMORY SYSTEM AND CONTROL METHOD CONTROLLING NONVOLATILE MEMORY IN ACCORDANCE WITH COMMAND ISSUED BY PROCESSOR

(71) Applicant: Kioxia Corporation, Tokyo (JP)

(72) Inventors: Hirotsugu Kajihara, Yokohama (JP); Kazuhiro Hiwada, Kamakura (JP); Shuou Nomura, Yokohama (JP); Tomoya Suzuki, Shinagawa (JP); Shintaro Sano, Kawasaki (JP)

(73) Assignee: Kioxia Corporation, Tokyo (JP)

(*) Notice: Subject to any disclaimer, the term of this patent is extended or adjusted under 35 U.S.C. 154(b) by 0 days.

(21) Appl. No.: 17/019,636

(22) Filed: Sep. 14, 2020

(65) Prior Publication Data
US 2021/0149599 A1 May 20, 2021

(30) Foreign Application Priority Data

Nov. 15, 2019 (JP) .............................. JP2019-207174

(51) Int. Cl.
*G06F 3/06* (2006.01)

(52) U.S. Cl.
CPC .......... *G06F 3/0659* (2013.01); *G06F 3/0604* (2013.01); *G06F 3/0629* (2013.01); *G06F 3/0656* (2013.01); *G06F 3/0658* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | |
|---|---|---|
| 8,285,943 B2 | 10/2012 | Takada et al. |
| 9,652,199 B2 | 5/2017 | Vucinic et al. |
| 2015/0081956 A1 | 3/2015 | Vucinic et al. |
| 2018/0300140 A1 | 10/2018 | Maeda |
| 2019/0163399 A1 | 5/2019 | Okada et al. |
| 2019/0171392 A1 | 6/2019 | Kim et al. |
| 2019/0278523 A1* | 9/2019 | Benisty ................. G06F 3/0629 |
| 2021/0081115 A1* | 3/2021 | Clarke .................. G06F 3/0611 |

OTHER PUBLICATIONS

NVM Express, "NVM Express™ Base Specification (Revision 1.4)", Jun. 10, 2019, pp. 1-403.

* cited by examiner

*Primary Examiner* — Edward J Dudek, Jr.
(74) *Attorney, Agent, or Firm* — Oblon, McClelland, Maier & Neustadt, L.L.P.

(57) ABSTRACT

According to one embodiment, a memory system includes a nonvolatile memory, and a controller configured to be connectable with a host and control the nonvolatile memory. The controller is configured to receive update frequency information of a submission queue from the host, read command information stored in the submission queue in accordance with the update frequency information, and execute controlling for the nonvolatile memory based on the command information.

19 Claims, 25 Drawing Sheets

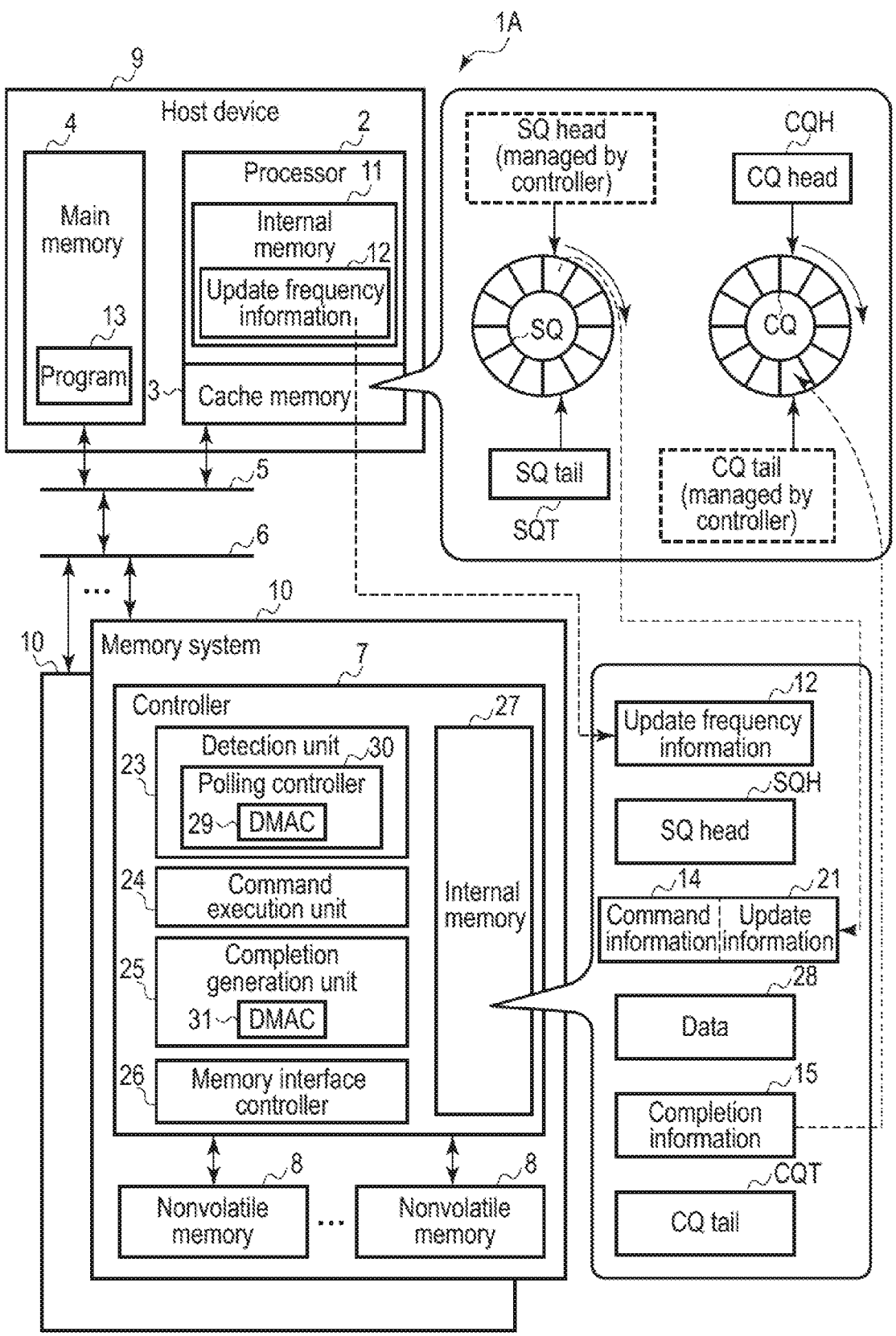
F I G. 1

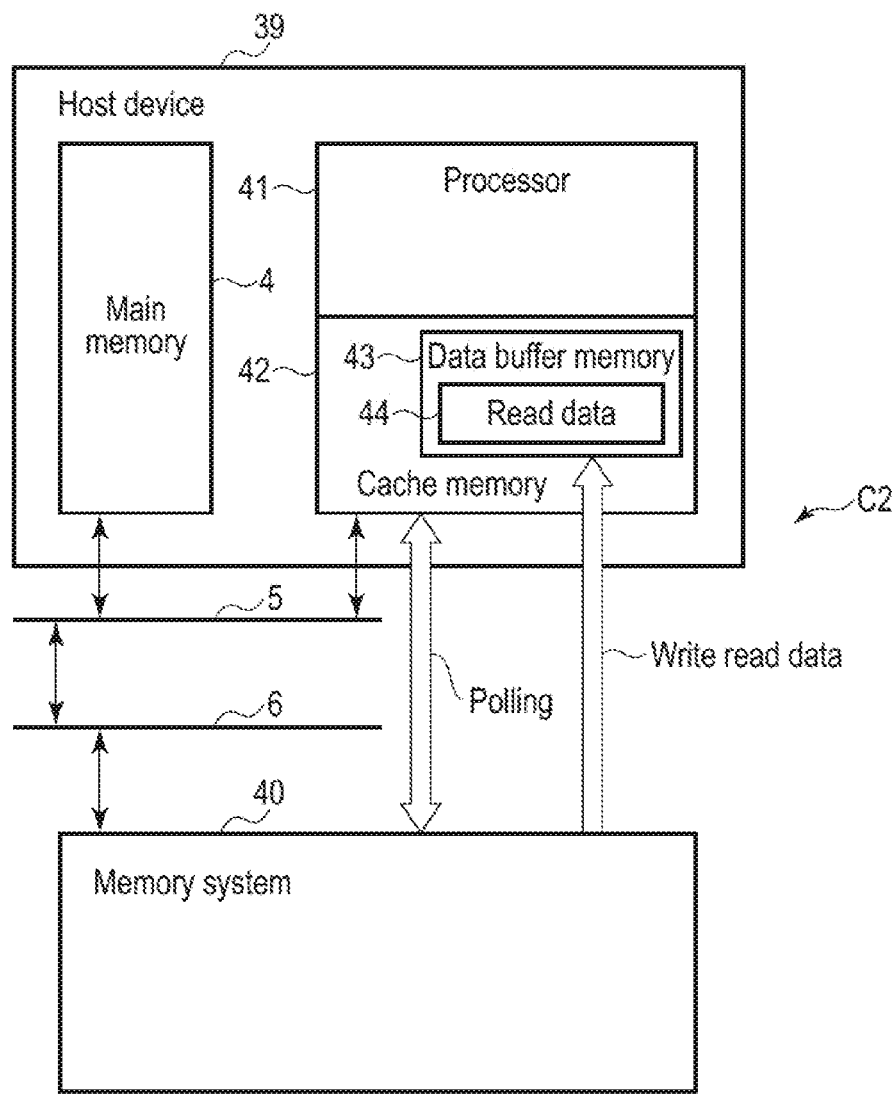
F I G. 6

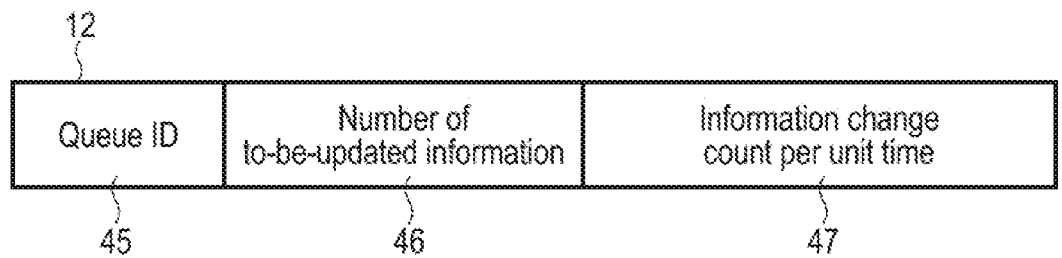
F I G. 7
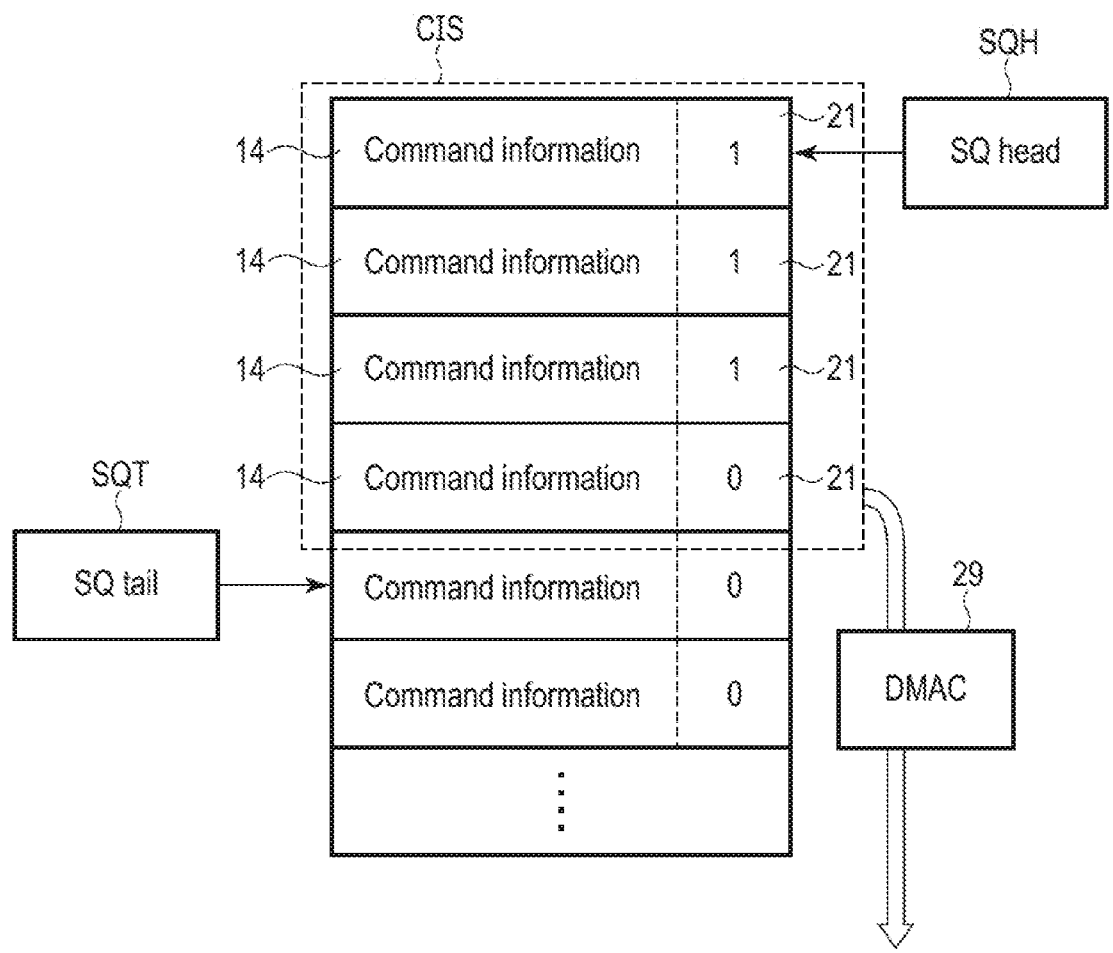
F I G. 8

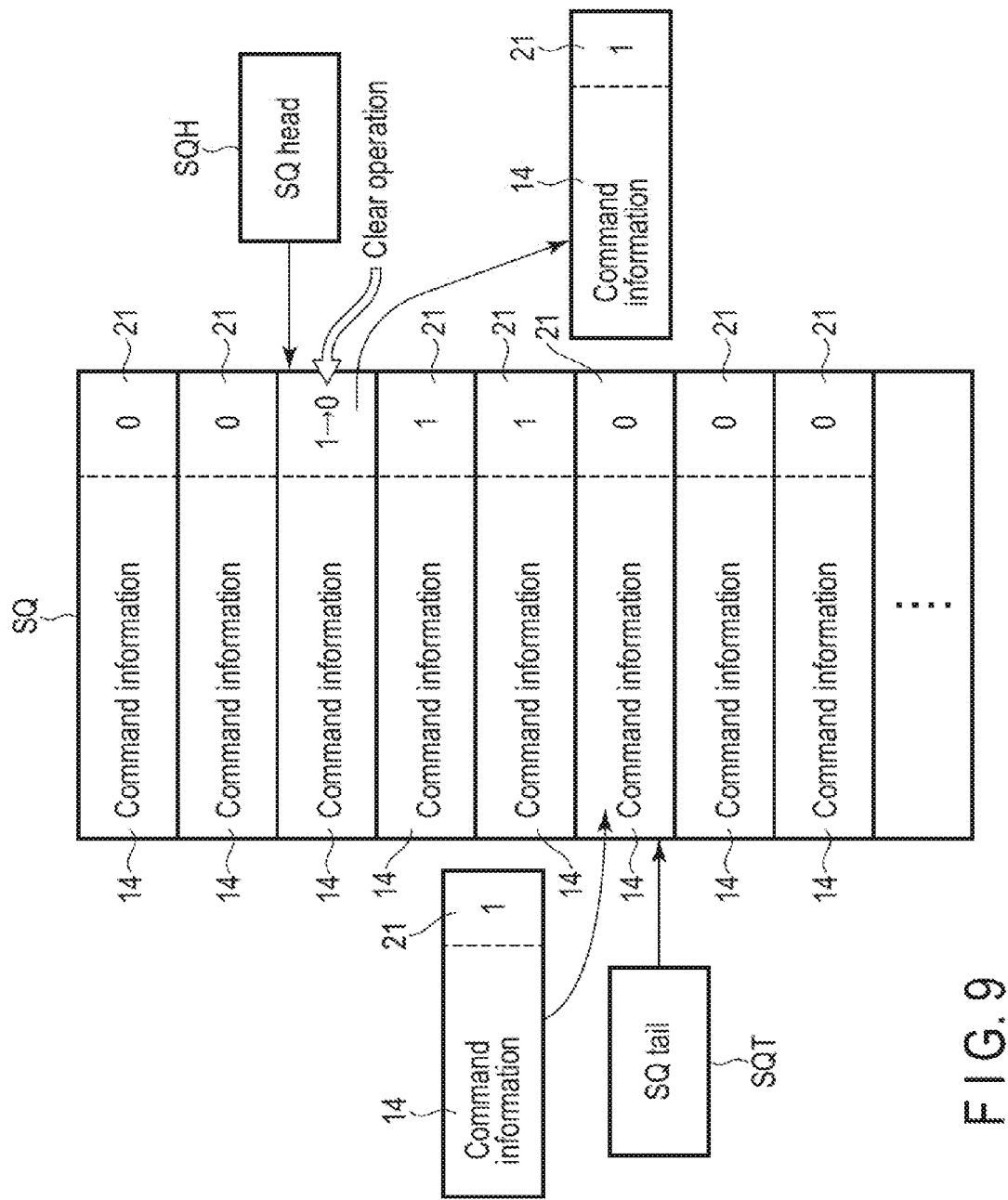
F I G. 9

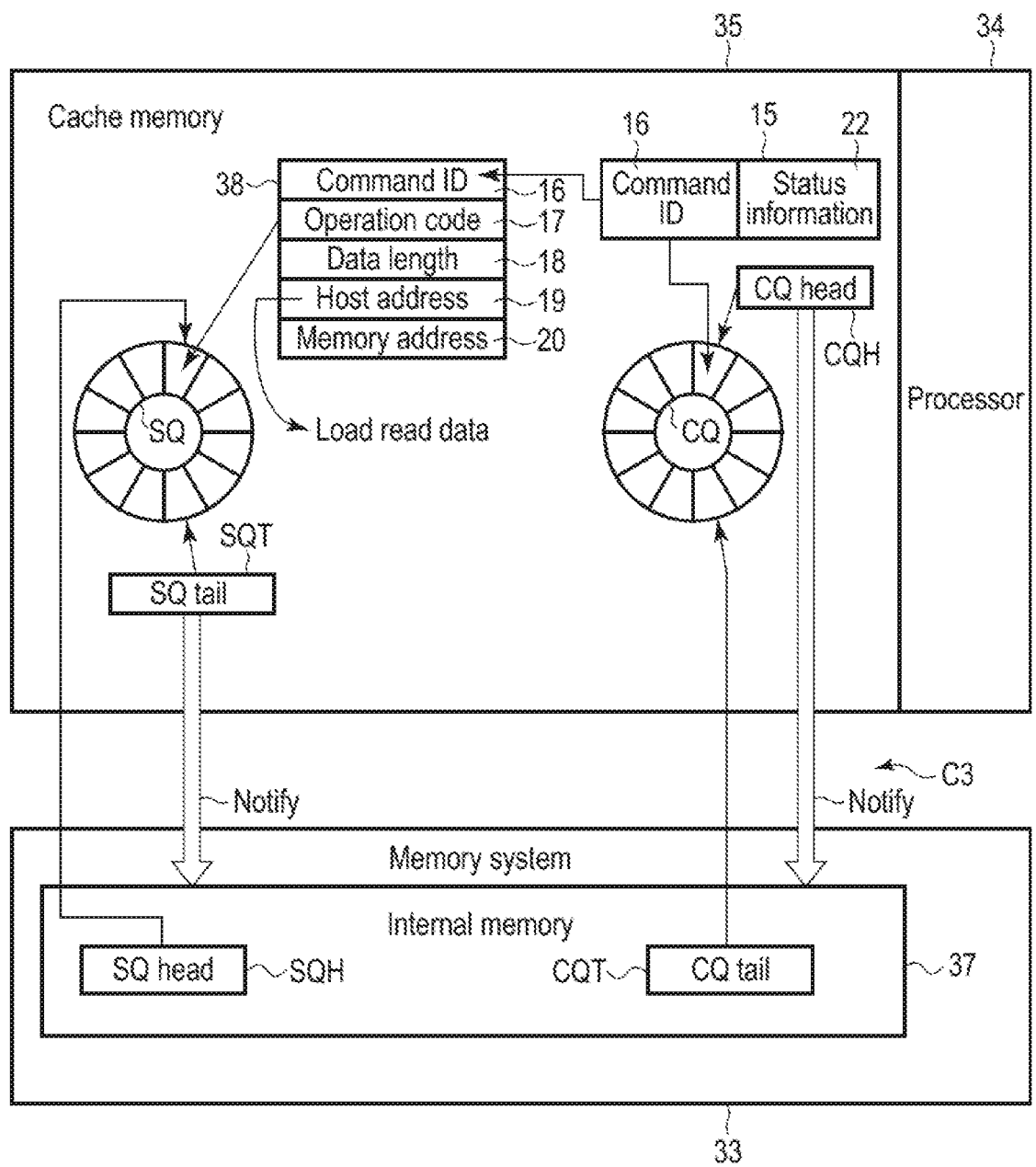
F I G. 14

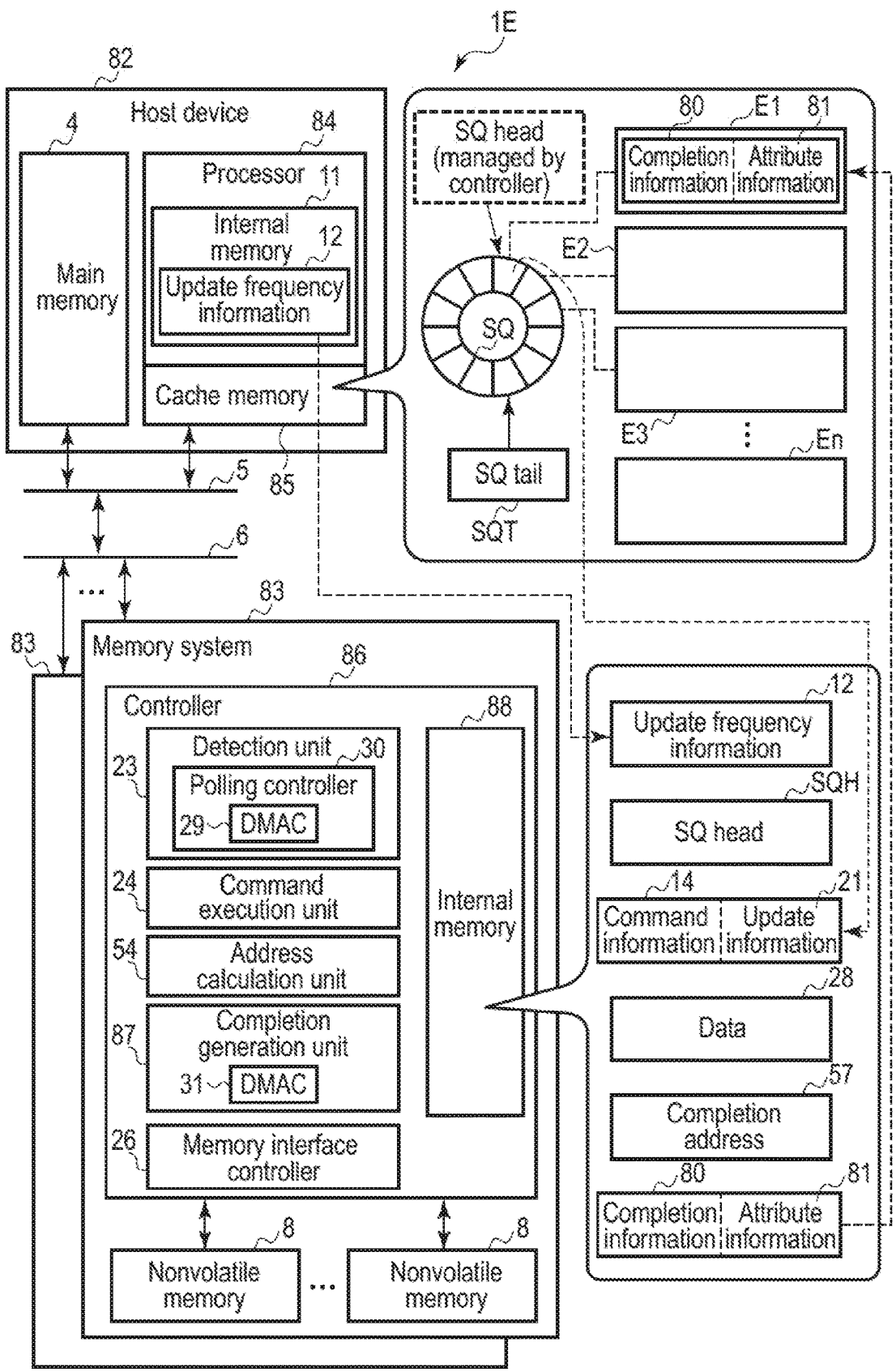
F I G. 22

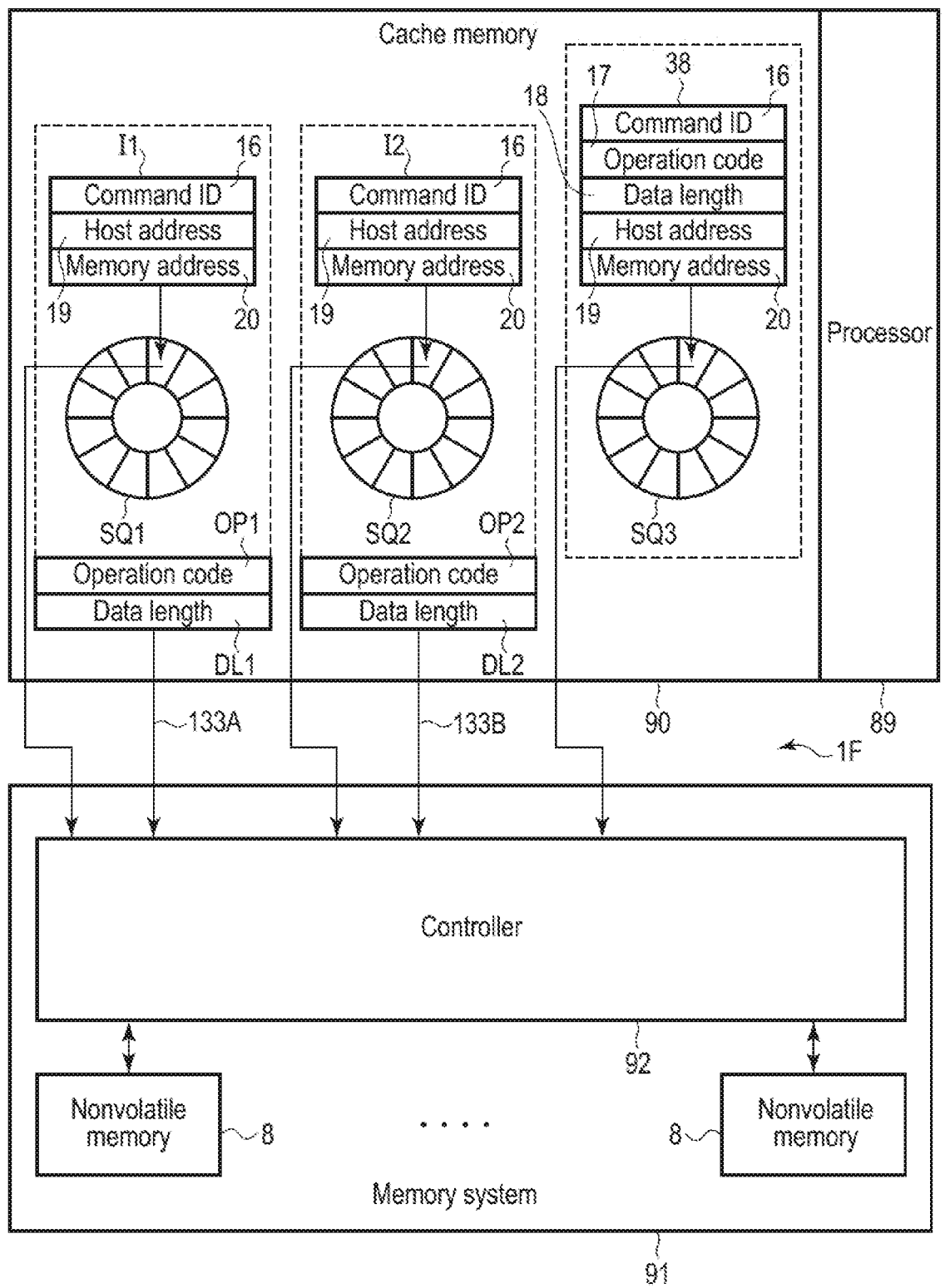
F I G. 23

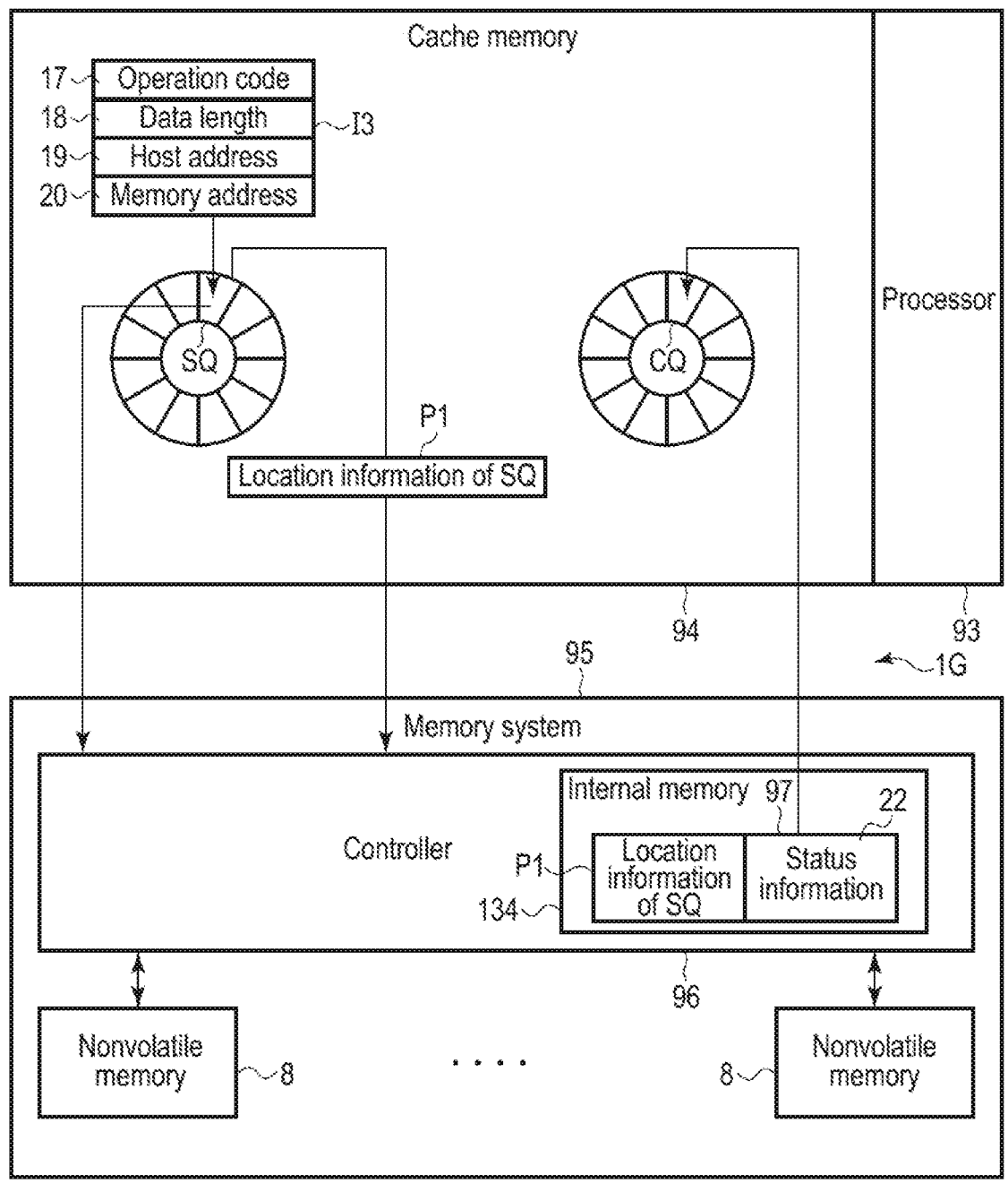
F I G. 24

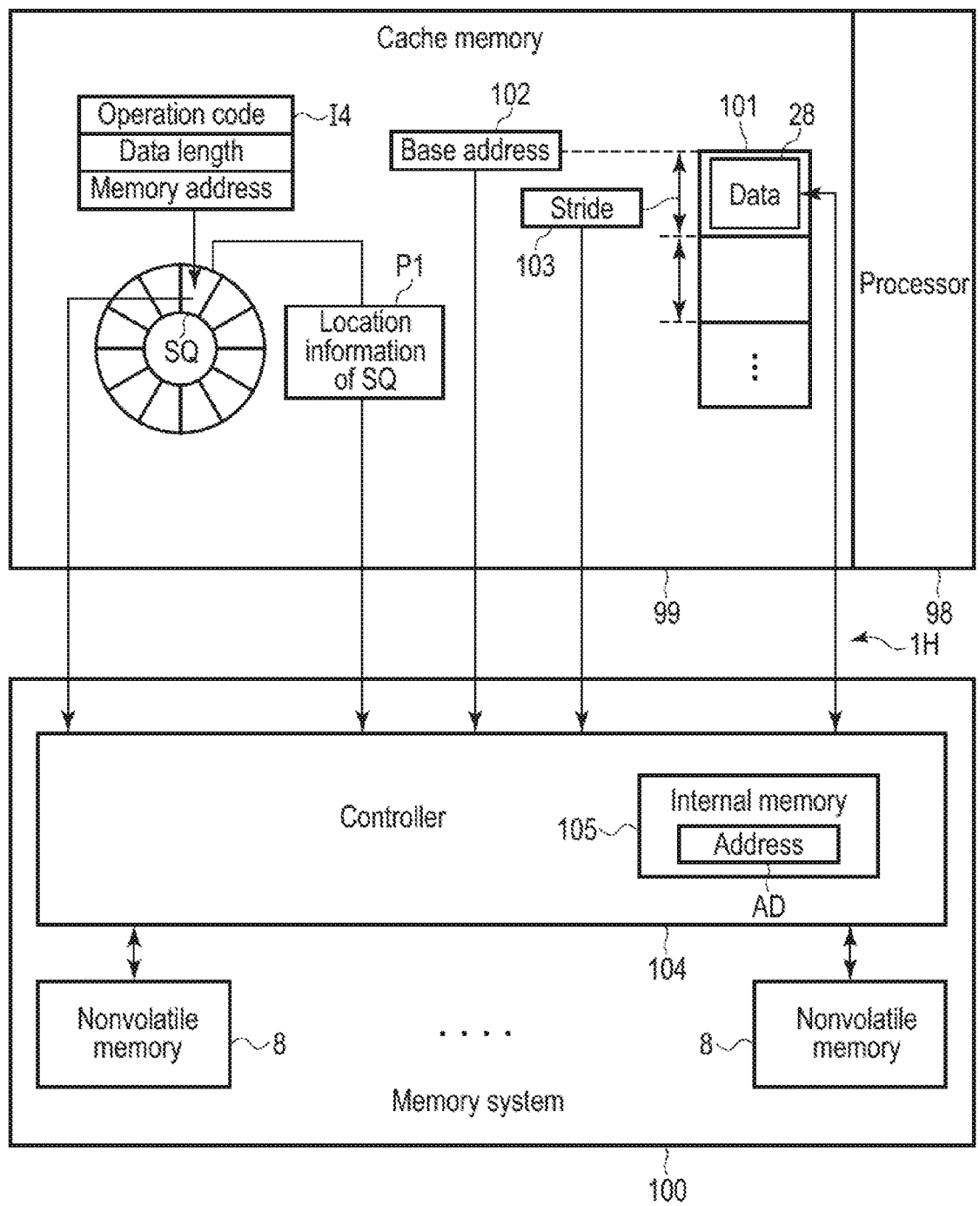
F I G. 25

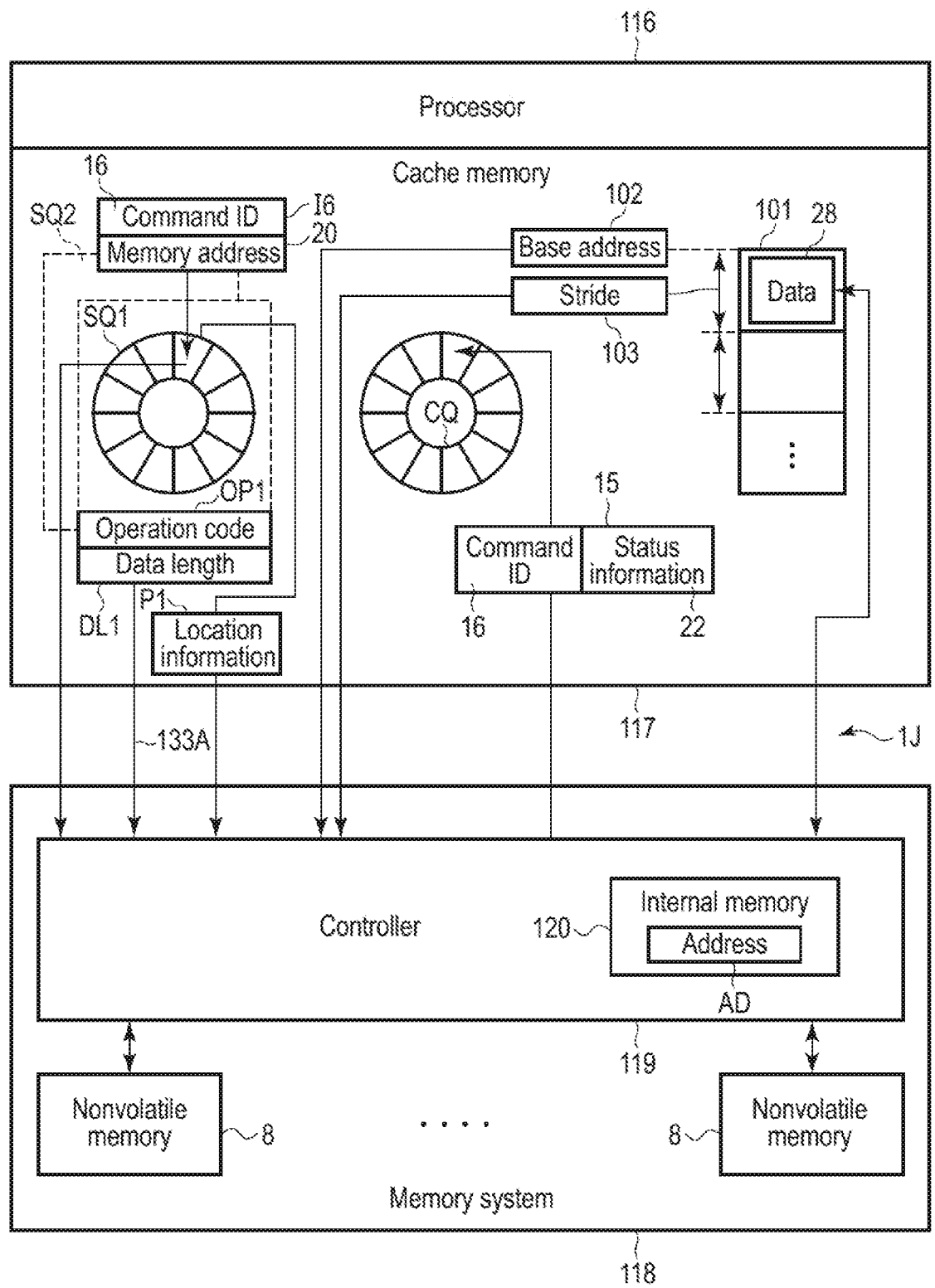
F I G. 27

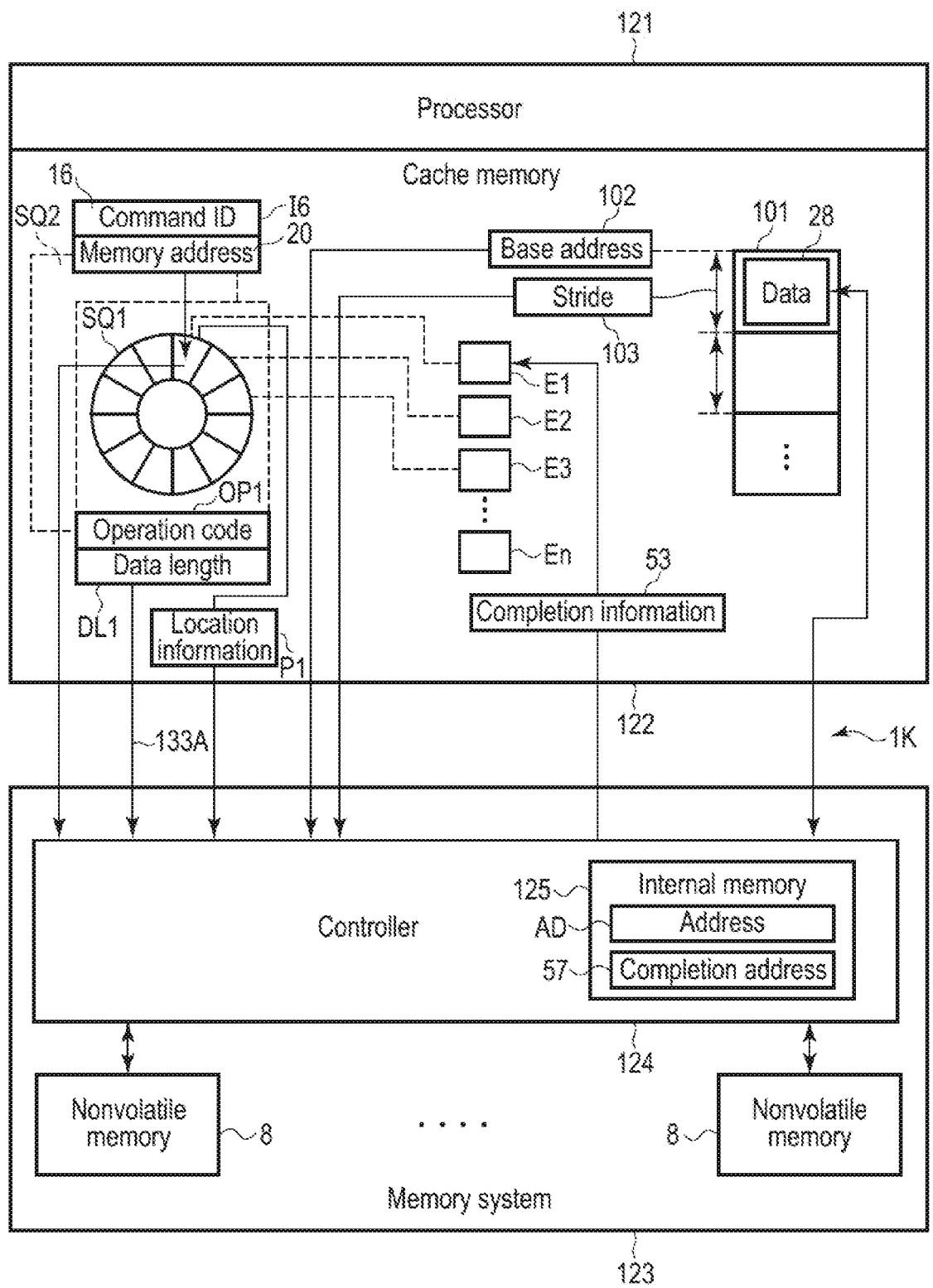
F I G. 28

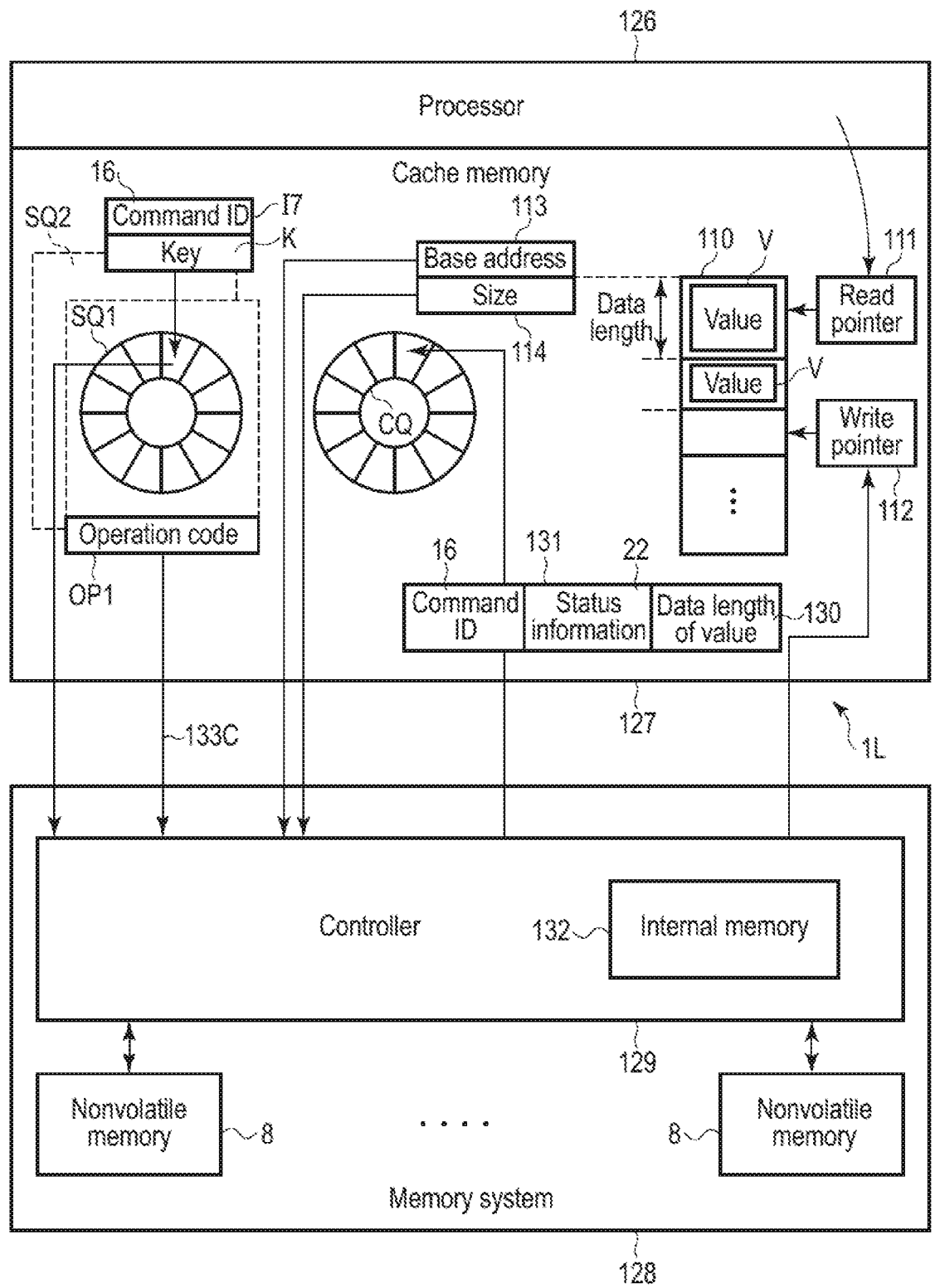
F I G. 29

MEMORY SYSTEM AND CONTROL METHOD CONTROLLING NONVOLATILE MEMORY IN ACCORDANCE WITH COMMAND ISSUED BY PROCESSOR

CROSS-REFERENCE TO RELATED APPLICATIONS

This application is based upon and claims the benefit of priority from Japanese Patent Application No. 2019-207174, filed Nov. 15, 2019, the entire contents of which are incorporated herein by reference.

FIELD

Embodiments described herein relate generally to a memory system and a control method controlling a nonvolatile memory in accordance with a command issued by a processor.

BACKGROUND

A memory system including a nonvolatile memory is widely prevalent. As an example of the memory system, a solid state drive (SSD) based on a NAND flash technology is known.

For example, the SSD is used as a storage device of a host computing system such as a data center server.

BRIEF DESCRIPTION OF THE DRAWINGS

FIG. 1 is a block diagram illustrating an example of a configuration of a storage system according to an embodiment 1-A.

FIG. 6 is a block diagram illustrating an example of a configuration of a storage system according to a second comparative example.

FIG. 7 is a diagram illustrating an example of a data configuration of update frequency information.

FIG. 8 is a diagram illustrating an example of command information which is wholly subjected to DMA transfer from a submission queue to an internal memory of a controller.

FIG. 9 is a diagram illustrating examples of statuses of update information included in the command information stored in the submission queue.

FIG. 14 is a block diagram illustrating an example of a configuration of a storage system according to a third comparative example.

FIG. 22 is a block diagram illustrating an example of a configuration of a storage system according to an embodiment 2-G.

FIG. 23 is a block diagram illustrating an example of a configuration of a storage system according to an embodiment 3-A.

FIG. 24 is a block diagram illustrating an example of a configuration of a storage system according to an embodiment 3-B.

FIG. 25 is a block diagram illustrating an example of a configuration of a storage system according to an embodiment 3-C.

FIG. 27 is a block diagram illustrating an example of a configuration of a storage system according to an embodiment 3-E.

FIG. 28 is a block diagram illustrating an example of a configuration of a storage system according to an embodiment 3-F.

FIG. 29 is a block diagram illustrating an example of a configuration of a storage system according to an embodiment 3-G.

DETAILED DESCRIPTION

Embodiments will be described hereinafter with reference to the accompanying drawings. In the following description, constituent elements having substantially the same function and configuration will be denoted by the same reference number, and description will be repeated only when necessary. Further, the following embodiments illustrate a device and a method which give concrete forms to technical ideas, and the technical ideas of the embodiments are not intended to limit materials, shapes, structures, arrangements, etc., of components to those descried below. The technical ideas of the embodiments can be modified in various manners in the scope of patent claims. Note that numerical values presented as examples in the following description are preferable numerical values and the embodiments are not limited to these numerical values.

In general, according to one embodiment, a memory system includes a nonvolatile memory, and a controller configured to be connectable with a host and control the nonvolatile memory. The controller is configured to receive update frequency information of a submission queue from the host, read command information stored in the submission queue in accordance with the update frequency information, and execute controlling for the nonvolatile memory based on the command information.

In each of embodiments hereinafter described, an efficiency of communication between a processor and a controller which controls a nonvolatile memory in accordance with a command issued by the processor, and an efficiency of control executed by the processor and the controller, are improved.

Embodiment 1-A

In an embodiment 1-A, a storage system in which a processor notifies a controller of an update frequency of information (hereinafter referred to as command information) which is related to a command and is stored in a queue, will be described.

FIG. 1 is a block diagram illustrating an example of a configuration of a storage system 1A according to the embodiment 1-A.

Figure 2:
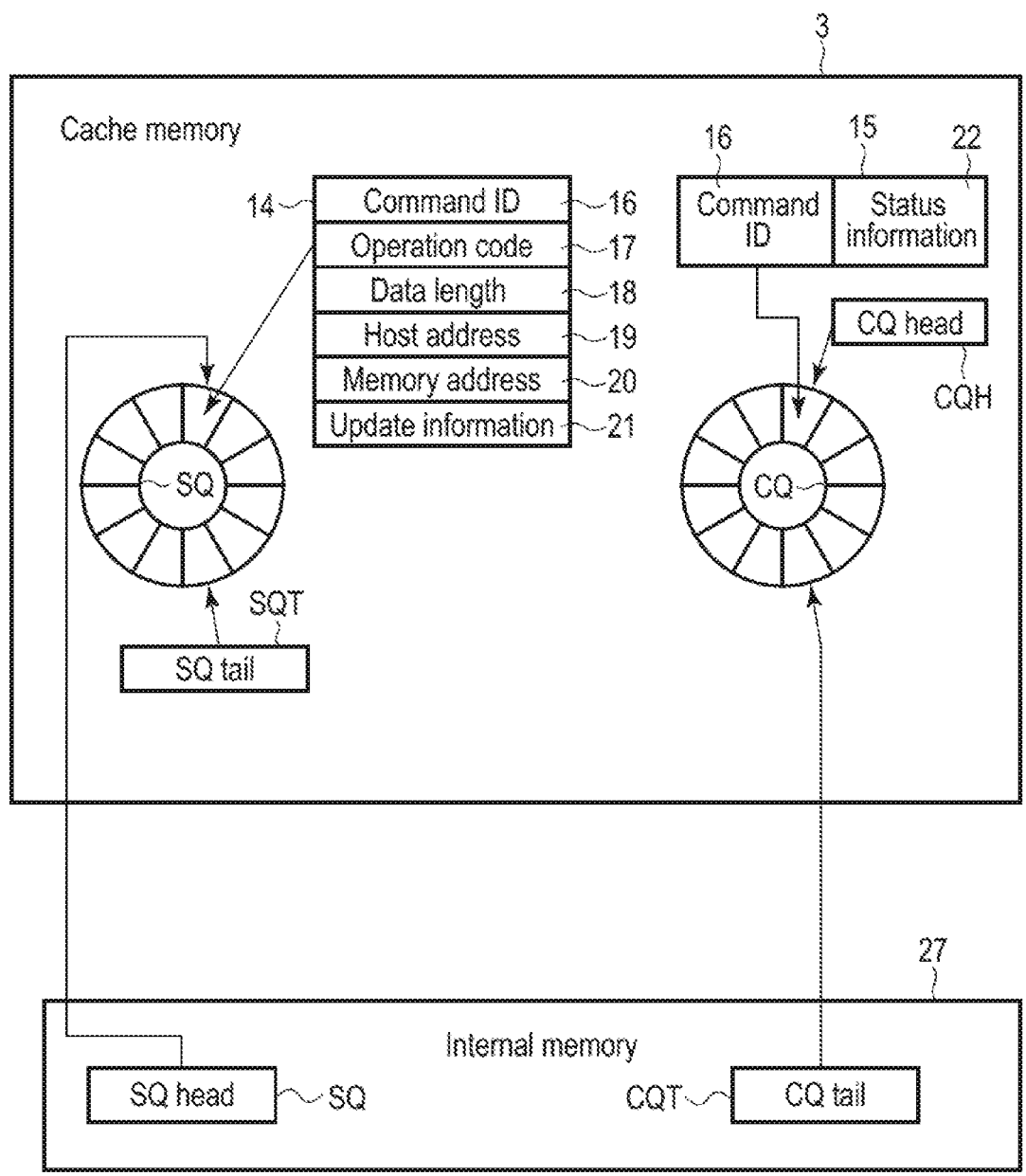
FIG. 2 is a diagram illustrating an example of a cache memory and an internal memory of a controller, according to the embodiment 1-A.

FIG. 2 is a diagram illustrating an example of a cache memory 3 and an internal memory 27 of a controller 7, according to the embodiment 1-A.

The storage system 1A includes a processor 2, the cache memory 3, a main memory 4, a system bus 5, a peripheral bus 6, the controller 7, and nonvolatile memories 8.

The processor 2, the cache memory 3, and the main memory 4 may be constituent elements of a host device 9. As the main memory 4, for example, a dynamic random access memory (DRAM) is used.

The controller 7 and the nonvolatile memories 8 may be constituent elements of a memory system 10. The storage system 1A may include a plurality of memory systems 10 that can operate in parallel.

A host device 9 executes data access using a queue control function to the memory system 10.

The processor 2 is, for example, a central processing unit (CPU), a graphics processing unit (GPU), a micro-processing unit (MPU) or the like. The processor 2 may be one processor core in a multi-core processor.

For example, the processor 2 includes an internal memory 11 such as a register. The internal memory 11 of the processor 2 stores update frequency information 12 designating an update frequency of a queue (hereinafter referred to as a submission queue) SQ, which stores command information related to a command issued by the processor 2. For example, the update frequency information 12 is generated by the processor 2. In other words, the update frequency information 12 is information designating a frequency of command issuing command by the processor 2. The update frequency information 12 may be stored in the cache memory 3 or the main memory 4 instead of the internal memory 11 of the processor 2.

The processor 2 can access the cache memory 3. The processor 2 can access the main memory 4 via the system bus 5. The processor 2 can communicate with the controller 7 of the memory system 10 via the system bus 5 and the peripheral bus 6. The processor 2 and the controller 7 send or receive, for example, information, data, request, instruction, command, notice, response and the like to or from each other via the system bus 5 and the peripheral bus 6.

To simplify the descriptions, description of the system bus 5 and the peripheral bus 6 may be omitted below.

The processor 2 operates in accordance with a program 13 stored in the cache memory 3 or the main memory 4.

In the embodiment 1-A, the processor 2 and the controller 7 operate in accordance with a communication interface formed by improving an NVMe standard.

The cache memory 3 includes the submission queue SQ which stores the command information 14 related to a command issued by the processor 2 and a queue (hereinafter referred to as a completion queue) CQ which stores completion information designating completion of the command.

In each of the following embodiments, order of writing each of the completion information 15 to the cache memory 3 may be different from order of reading the command information 14 corresponding to each of the completion information 15 from the submission queue SQ. In other words, the completion information 15 is writable to the cache memory 3 in arbitrary order.

For example, the cache memory 3 may be provided in the processor 2 or may be configured separately from the processor 2. The cache memory 3 may also be configured in each of the following embodiments.

The submission queue SQ and the completion queue CQ are assumed to be ring buffers (ring queues).

The submission queue SQ is used to notify the controller 7 of the command information 14 from the processor 2.

The submission queue SQ includes a plurality of areas of management units. For example, one management unit may be capable of storing one command information 14. The management unit may be, for example, a unit of data which is read by one read operation. The management unit may be, for example, a unit of data which is written by one write operation. One of command information 14 may have a size that can be efficiently processed by the processor 2 or the controller 7.

Writing the command information 14 to the submission queue SQ and reading the command information 14 from the submission queue SQ are executed in a first-in first-out method.

In the embodiment 1-A, a write pointer (hereinafter referred to as an SQ tail) SQT to the submission queue SQ is managed by storing in the cache memory 3. The SQ tail SQT is updated by, for example, the processor 2. The SQ tail SQT is a pointer designating a location in the submission queue SQ to which the command information 14 related to the command issued by the processor 2 is to be next written. Incidentally, the SQ tail SQT may be managed by storing in, for example, a memory other than the cache memory 3, such as the internal memory 11 of the processor 2, the main memory 4, or the internal memory 27 of the controller 7.

A read pointer (hereinafter referred to as an SQ head) SQH to the submission queue SQ is managed by storing in the internal memory 27 of the controller 7. The SQ head SQH is updated by, for example, the controller 7. The SQ head SQH is a pointer designating a location of the command information 14 which is to be next read from the submission queue SQ. Incidentally, the SQ head SQH may be managed by storing in, for example, a memory other than the internal memory 27 of the controller 7, such as the internal memory 11 of the processor 2, the cache memory 3, or the main memory 4.

The command information 14 written to the submission queue SQ by the processor 2 includes, for example, a command ID 16, an operation code 17, a data length 18, a host address 19, a memory address 20, and update information 21. In other words, the command information 14 is a request.

The command ID 16 is identification information assigned individually to the command issued by the processor 2. When the command ID 16 is included in the command information 14, the command can be associated with a control result even if order of executing control for the command information 14 is out of order.

The operation code 17 designates a type of the command to be executed.

The data length 18 designates a size of data related to the command. The data length 18 is a size of the read data when, for example, the command is a read command and is a size of the write data when, for example, the command is a write command. Incidentally, when the command does not handle data, the data length 18 may not be included in the command information 14.

The host address 19 designates a location on a side of the host device 9 for storing data related to the command. For example, when the command is a write command, the host address 19 designates a location on the side of the host device 9 where write data is stored. For example, when the command is a read command, the host address 19 designates a location on the side of the host device 9 where read data is to be written.

The memory address 20 designates a location on a side of the memory system 10 for storing data related to the command. For example, when the command is a write command, the memory address 20 designates a location on the side of the memory system 10 which is to be a write destination of write data. For example, when the command is a read command, the memory address 20 designates a location on the side of the memory system 10 where read data is stored.

The update information 21 is information designating whether the command information 14 stored in the submission queue SQ is updated or not. More specifically, the update information 21 is information used to determine whether the command information 14 stored in the submission queue SQ is untreated or not.

The completion queue CQ is used to notify the processor 2 of command completion from the controller 7. The completion queue CQ includes a plurality of areas of management units, and can store a plurality of completion information 15. One of command information 15 may have a size that can be efficiently processed by the processor 2 or the controller 7.

The completion information 15 includes, for example, a command ID 16 and status information 22.

The command ID 16 designates a command corresponding to the completion information 15. The completion information 15 is completion information related to the command designated by the command ID 16.

The status information 22 designates a status of the command designated by the command ID 16. For example, when the command designated by the command ID 16 is normally completed, the status information 22 designates normal completion. For example, when an error occurs in execution the command designated by the command ID 16, the status information 22 designates occurrence of error.

Writing the completion information 15 to the completion queue CQ and reading the completion information 15 from the completion queue CQ are executed in a first-in first-out method.

In the embodiment 1-A, a write pointer (hereinafter referred to as a CQ tail) CQT to the completion queue CQ is managed by storing in the internal memory 27 of the controller 7. The CQ tail CQT is updated by, for example, the controller 7. The CQ tail CQT is a pointer designating a location in the completion queue CQ where the completion information 15 generated by the controller 7 is to be next written. Incidentally, the CQ tail CQT may be managed by storing in, for example, a memory other than the internal memory 27 of the controller 7, such as the internal memory 11 of the processor 2, the cache memory 3, or the main memory 4.

A read pointer (hereinafter referred to as a CQ head) CQH to the completion queue CQ is managed by storing in the cache memory 3. The CQ head CQH is updated by, for example, the processor 2. The CQ head CQH is a pointer designating a location of the completion information 15 which is to be next read from the completion queue. Incidentally, the CQ head CQH may be managed by storing in, for example, a memory other than the cache memory 3, such as the internal memory 11 of the processor 2, the main memory 4, or the internal memory 27 of the controller 7.

When issuing a command, the processor 2 writes the command information 14 to a location designated by the SQ tail SQT of the submission queue SQ and updates (for example, increments) a value of the SQ tail SQT.

When reading the completion information 15 from a location designated by the CQ head CQH of the completion queue CQ, the processor 2 updates (for example, increments) a value of the CQ head CQH.

The processor 2 determines which command is completed based on the command ID 16 in the read completion information 15 and determines a status designated by the status information 22.

The controller 7 controls the nonvolatile memories 8 in accordance with command information 14 notified by the processor 2. For example, the controller 7 executes control for writing write data to the nonvolatile memories 8, based on command information 14 corresponding to a write command. For example, the controller 7 reads read data from the nonvolatile memories 8 and writes the read data to the cache memory 3 or the main memory 4, based on command information 14 corresponding to a read command.

More specifically, the controller 7 reads (fetches) command information 14 from a location designated by the SQ head SQH of the submission queue SQ and executes a command, based on the command information 14. Then, the controller 7 writes completion information 15 to a location designated by the CQ tail of the completion queue CQ after executing the command.

In the embodiment 1-A, for example, the controller 7 can control each of the nonvolatile memories 8 in parallel. However, the controller 7 may control one nonvolatile memory 8.

The controller 7 includes a detection unit 23, a command execution unit 24, a completion generation unit 25, a memory interface controller 26, and an internal memory 27 of the controller 7.

The internal memory 27 of the controller 7 stores the update frequency information 12 notified by the processor 2, the SQ head SQH, command information 14 which is read from the submission queue SQ, data 28 such as read data or write data, completion information 15, and the CQ tail CQT.

As the internal memory 27 of the controller 7, for example, a register, a cache memory, a buffer memory, a main memory, or the like is used. A part or all parts of the internal memory 27 of the controller 7 may be configured separately from the controller 7. Incidentally, likewise, in each of the following embodiments, a register, a cache memory, a buffer memory, or a main memory may be used as the internal memory of the controller. In addition, likewise, in each of the following embodiments, a part or all parts of the internal memory of the controller may be configured separately from the controller.

The detection unit 23 includes a polling controller 30. The polling controller 30 includes a direct memory access controller (DMAC) 29.

The DMAC 29 transfers the update frequency information 12 stored in the internal memory 11 of the processor 2 to the internal memory 27 of the controller 7. Thereby, the controller 7 receives the update frequency information 12 from the processor 2.

Incidentally, in each of the following embodiments, data transfer in which an element sends information or data to the other element and the other element receives the information or the data from the element may be employed instead of data transfer using a DMAC. More specifically, in each of the embodiments, memory mapped input/output (MMIO) may be employed instead of transfer using the DMAC.

For example, the DMAC 29 periodically executes polling and transfers command information 14 from the location designated by the SQ head SQH of the submission queue SQ to the internal memory 27 of the controller 7, based on the update frequency designated by the update frequency information 12. Then, the polling controller 30 updates (increments) u value of the SQ head SQH. Incidentally, as illustrated in an embodiment 1-C, the polling controller 30 may read a plurality of command information 14 by using the location designated by the SQ head SQH of the submission queue SQ as a reference, per one polling.

When the update information 21 included in the command information 14 designates updating, the command execution unit 24 executes control of the nonvolatile memories 8, based on the command information 14. For example, when executing a read command, the command execution unit 24 writes the data 28 read from the nonvolatile memories 8, to the internal memory 27 of the controller 7, and writes the data 28 in the internal memory 27 of the controller 7 to the cache memory 3. For example, when executing a write command, the command execution unit 24 writes the data 28 stored in the cache memory 3 to the internal memory 27 of the controller 7 and writes the data 28 of the internal memory 27 of the controller 7 to the nonvolatile memories 8.

When the update information 21 included in the command information 14 designates non-updating, the command execution unit 24 discards the command information 14.

The completion generation unit 25 includes a DMAC 31.

The completion generation unit 25 generates completion information 15 of control executed based on the command information 14 and writes the completion information 15 to the internal memory 27 of the controller 7.

The DMAC 31 transfers the completion information 15 of the internal memory 27 of the controller 7 to the location designated by the CQ tail CQT of the completion queue CQ. Incidentally, MMIO may be used instead of transfer using the DMAC 31, as described above. Then, the completion generation unit 25 updates (for example, increments) a value of the CQ tail CQT.

The memory interface controller 26 controls writing the data 28 to the nonvolatile memories 8, reading the data 28 from the nonvolatile memories 8, and erasing for the nonvolatile memories 8.

Each of the nonvolatile memories 8 may be NAND flash memory chip (NAND flash memory die). Each of the nonvolatile memories 8 can operate independently. For this reason, the nonvolatile memory 8 functions as a unit that can operate in parallel.

Each of the nonvolatile memories 8 may be, for example, the other nonvolatile memory such as an NOR flash memory, a magnetoresistive random access memory (MRAM), a phasechange random access memory (PRAM), a resistive random access memory (ReRAM), or a ferroelectric random access memory (FeRAM). For example, each of the nonvolatile memories 8 may be a magnetic memory, a semiconductor memory having a three-dimensional structure or the like.

Reading data from or writing data to the nonvolatile memories 8 may be executed in a unit referred to as a page. Erasing data in the nonvolatile memories 8 can be executed in a unit referred to as a block. One unit of the block includes a plurality of pages. Reading data from and writing data to the nonvolatile memories 8 may be executed in a unit including a plurality of pages. Erasing data may be executed in a unit including a plurality of blocks.

In the above-described configuration of the controller 7, the DMAC 29 and the DMAC 31 may be integrated.

A process executed by the storage system 1A according to the embodiment 1-A having the above-described configuration will be described below.

Figure 3:
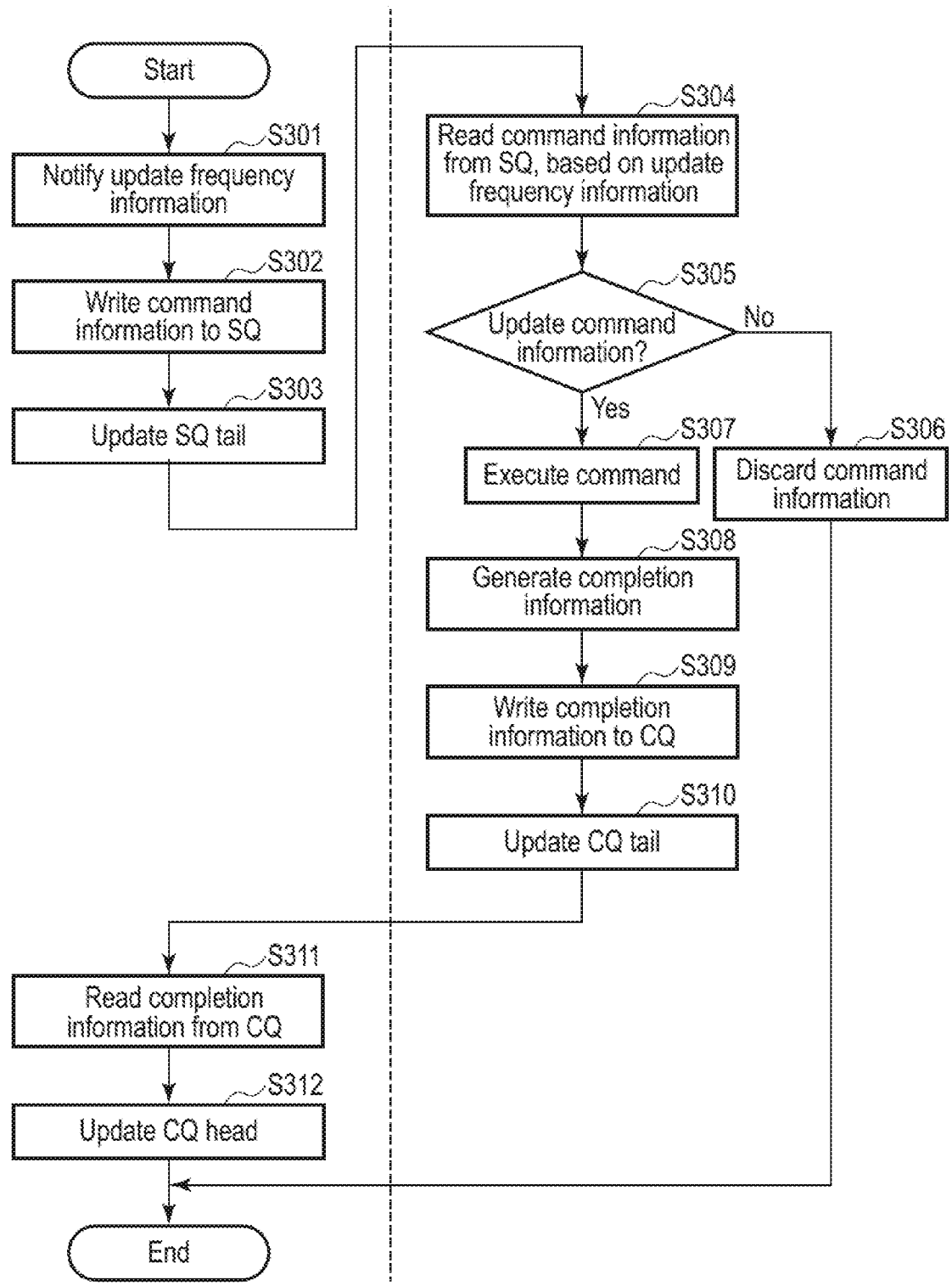
FIG. 3 is a flowchart illustrating an example of a process executed by the storage system according to the embodiment 1-A.

FIG. 3 is a flowchart illustrating an example of a process executed by the storage system 1A according to the embodiment 1-A.

The processor 2 notifies the polling controller 30 of the update frequency information 12 of the submission queue SQ in advance (for example, during a period after the storage system 1A starts up and until the polling controller 30 starts polling) (S301).

After notifying the update frequency information 12, the processor 2 writes the command information 14 including the update information 21 to the location designated by the SQ tail SQT of the submission queue SQ (S302) and updates the value of the SQ tail SQT (S303).

The detection unit 23 of the controller 7, for example, reads the command information 14 from the submission queue SQ periodically designated by the SQ head SQH and writes the command information 14 to the internal memory 27 of the controller 7, based on the update frequency information 12 notified by the processor 2 (S304).

The command execution unit 24 determines whether the update information 21 included in the command information 14 designates updating or not (S305).

When the update information 21 designates non-updating, the command execution unit 24 discards the command information 14 (S306) and the process ends.

When the update information 21 designates updating, the command execution unit 24 executes a command, based on the command information 14 (S307).

The completion generation unit 25 generates the completion information 15 of control executed by the command execution unit 24 and writes the completion information 15 to the internal memory 27 of the controller 7 (S308).

The DMAC 31 of the completion generation unit 25 transfers the completion information 15 from the internal memory 27 of the controller 7 to the location designated by the CQ tail CQT of the completion queue CQ. The completion information 15 is thereby written to the completion queue CQ (S309). The completion generation unit 25 updates the value of the CQ tail CQT (S310).

The processor 2 reads the completion information 15 from the location designated by the CQ head CQH of the completion queue CQ (S311) and updates the value of the CQ head CQH (S312).

Features of the storage system 1A according to the embodiment 1-A will be hereinafter described in comparison with a storage system of a first comparative example.

Figure 4:
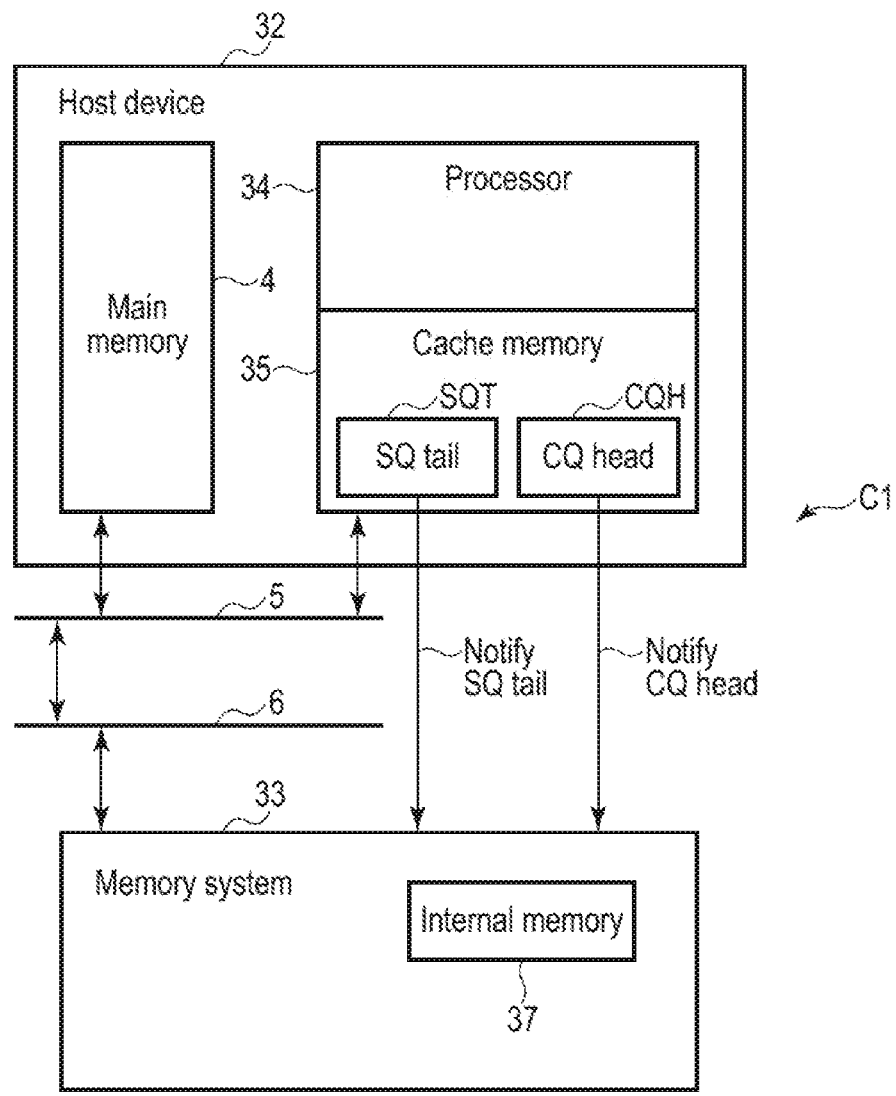
FIG. 4 is a block diagram illustrating an example of a configuration of a storage system according to a first comparative example.

FIG. 4 is a block diagram illustrating an example of a configuration of a storage system C1 according to the first comparative example.

Figure 5:
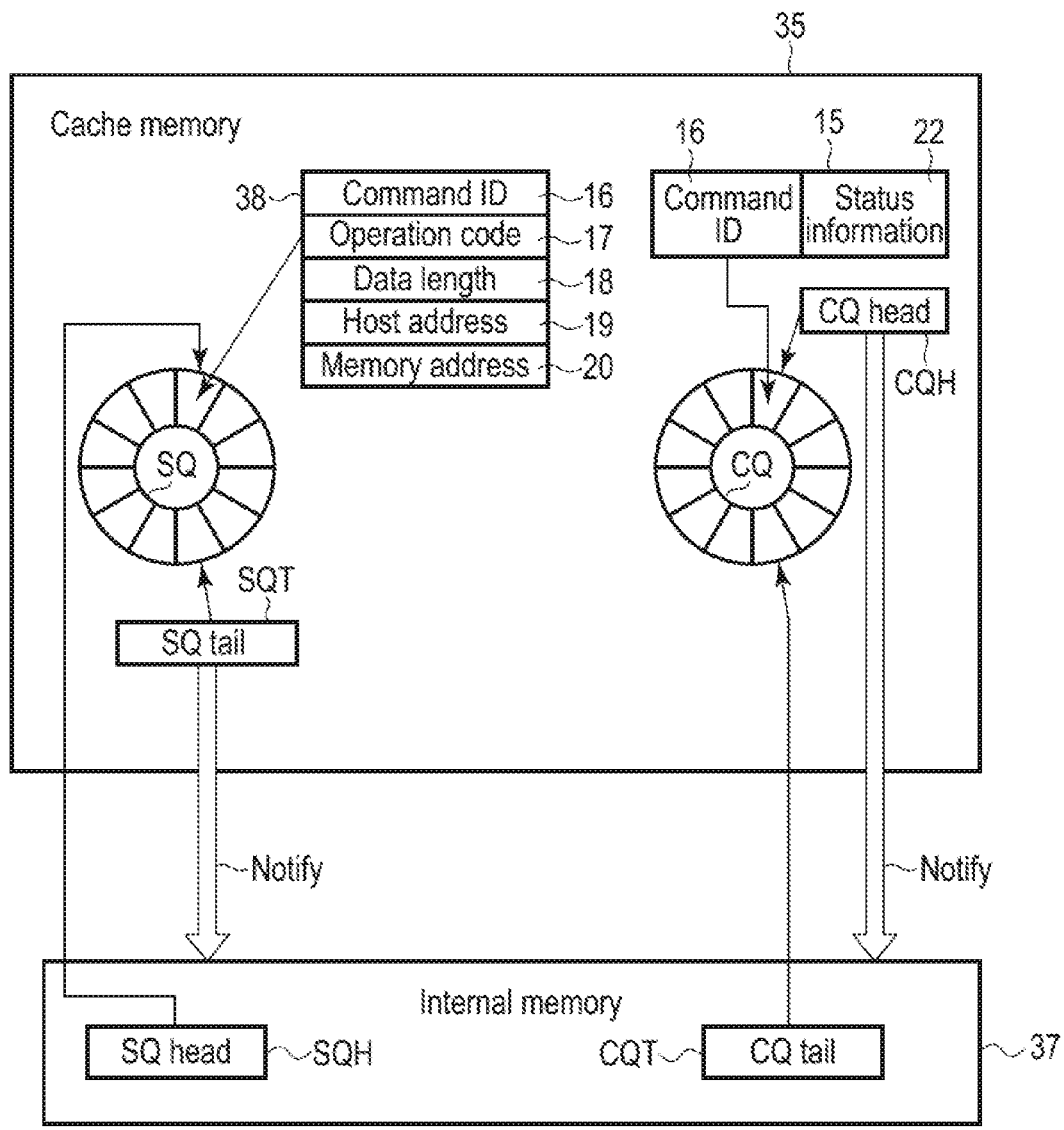
FIG. 5 is a block diagram illustrating an example of a cache memory and an internal memory of a memory system, according to a first comparative example.

In addition, FIG. 5 is a block diagram illustrating an example of a cache memory 35 and an internal memory 37 of a memory system 33, according to the first comparative example.

The storage system C1 of the first comparative example includes a host device 32, the system bus 5, the peripheral bus 6, and a memory system 33. The host device 32 includes a processor 34, the cache memory 35, and the main memory 4. The memory system 33 includes an internal memory 37.

In the first comparative example, the processor 34 and the memory system 33 operate according to the NVMe standard.

The cache memory 35 includes the submission queue SQ and the completion queue CQ.

In the first comparative example, the SQ tail SQT is managed in the cache memory 35. The SQ tail SQT is updated by, for example, the processor 34. The SQ head SQH is managed in, for example, the memory system 33. The SQ head SQH is updated by, for example, the memory system 33.

Command information 38 stored in the submission queue SQ by the processor 34 includes, for example, the command ID 16, the operation code 17, the data length 18, the host address 19, and the memory address 20.

The completion queue CQ stores the completion information 15.

In the first comparative example, the CQ tail CQT is managed in the memory system 33. The CQ tail CQT is updated by, for example, the controller 33. The CQ head CQH is managed in, for example, the cache memory 35. The CQ head CQH is updated by, for example, the processor 34.

In the first comparative example, when notifying the memory system 33 of a command from the processor 34, the processor 34 writes the command information 38 to the location designated by the SQ tail SQT of the submission queue SQ, notifies the memory system of the SQ tail SQT (hereinafter referred to as mmio (Memory Mapped IO)_write "SQ Tail"), and updates the value of the SQ tail SQT.

When receiving the notice of the SQ tail SQT, the memory system 33 reads (fetches) the command information 38 within a range from the SQ head SQH to the SQ tail SQT.

In addition, in the first comparative example, when notifying the processor 34 of completion from the memory system 33, the memory system 33 writes the completion information 15 to the location designated by the CQ tail CQT of the completion queue CQ and updates the value of the CQ tail CQT.

The processor 34 reads the completion information 15 in the location designated by the CQ head CQH of the completion queue CQ, determines an executed command and a status of the executed command, notifies the memory system 33 of the CQ head CQH (hereinafter referred to as mmio_write "CQ Head"), and updates the value of the CQ head CQH.

A process mmio_write including mmio_write "SQ Tail" and mmio_write "CQ Head" may be referred to as doorbell control.

In the first comparative example, a process load of the processor 34 for writing the command information 38 to the submission queue SQ and notifying the memory system 33 of the SQ tail SQT is large. In addition, a process load of the processor 34 for reading the completion information 15 from the completion queue CQ and notifying the memory system 33 of the CQ head CQH is also large.

In contrast, in the storage system 1A according to the embodiment 1-A, the processor 2 notifies the controller 7 of the update frequency information 12 in advance and does not notify the controller 7 of the SQ tail SQT. In addition, the processor 2 writes the command information 14 including the update information 21 to the submission queue SQ. The controller 7 reads the command information 14 including the update information 21 from the submission queue SQ, in accordance with the update frequency designated by the update frequency information 12. The controller 7 executes controlling based on the command information 14 when the update information 21 included in the read command information 14 designates updating, and discards the command information 14 when the update information 21 designates non-updating.

In the storage system 1A according to the embodiment 1-A, mmio_write "SQ Tail" in the first comparative example can be excluded and the processor 2 can efficiently notify the controller 2 of information designating that the command information 14 has been stored in the submission queue SQ.

More specifically, in the storage system C1 of the first comparative example, it is necessary that the processor 34 notifies the memory system 33 of the SQ tail SQT and that the processor 34 notifies the memory system 33 of the command information 38. In contrast, in the storage system 1A according to the embodiment 1-A, the processor 2 does not need to notify the memory system 10 of the SQ tail SQT, and the processor 2 may notify the memory system 10 of the command information 14.

For this reason, in the storage system 1A according to the embodiment 1-A, a process load of the processor 2 can be reduced and the number of transactions of the system bus 5 and the peripheral bus 6 can be reduced. Therefore, in the storage system 1A, process time of control based on a communication interface between the host device 9 and the memory system 10 can be reduced, an efficiency of use of the system bus 5 and the peripheral bus 6 can be lowered, and input/output per second (IOPS) of the storage system 1A can be increased.

The storage system 1A according to the embodiment 1-A is effective when the system bus 5 and the peripheral bus 6 are broadband transmission buses. For example, the storage system 1A of the embodiment 1-A can stably achieve IOPS equivalent to a DRAM or a static random access memory (SRAM), and the storage system 1A of the embodiment 1-A can be used instead of the DRAM or the SRAM.

In the storage system C1 of the first comparative example, a process load of the processor 34 is large, and performance of the storage system C1 of the first comparative example is, for example, approximately 10 mega IOPS per processor 34. In the storage system C1 of the first comparative example, completion of mmio_write may be awaited for approximately 100 nanoseconds.

In contrast, in the storage system 1A according to the embodiment 1-A, for example, performance being larger than or equal to 50 mega IOPS per processor 34 can be implemented by excluding mmio_write "SQ Tail".

Features of the storage system 1A according to embodiment 1-A will be hereinafter described in comparison with a storage system of a second comparative example.

FIG. 6 is a block diagram illustrating an example of a configuration of a storage system C2 according to the second comparative example.

The storage system C2 of the second comparative example includes a host device 39, the system bus 5, the peripheral bus 6, and a memory system 40. The host device 39 includes a processor 41, a cache memory 42, and the main memory 4.

In the second comparative example, the memory system 40 executes polling for the processor 41 and detects that the command information 38 is stored in the submission queue SQ. In the memory system 40, however, the processor 41 does not includes a function of notifying the memory system 40 of the update frequency information 12 according to the embodiment 1-A.

In addition, in the second comparative example, the memory system 40 does not write the completion information 15 to the cache memory 42 at read completion. The processor 41 initializes a data buffer memory 43 in the cache memory 42 and the memory system 40 writes read data 44 to the data buffer memory 43 before the read completion. The processor 41 detects the read completion when detecting update of data in the data buffer memory 43. In the second comparative example, the processor 41 detects completion without using the completion queue CQ and the completion information 15 at only read time.

In contrast, in the storage system 1A according to the embodiment 1-A, the processor 2 notifies the controller 7 of the update frequency information 12. For this reason, the controller 7 can set timing or interval of polling more appropriately than the memory system 40 of the second comparative example, and the controller 7 can read the command information 14 from the submission queue SQ more efficiently than the memory system 40 of the second comparative example.

Furthermore, in the storage system 1A according to the embodiment 1-A, the update information 21 is included in the command information 14. However, the update information 21 is not included in the command information 38 of the second comparative example. For this reason, the controller 7 can appropriately set the timing or interval of the polling based on the update frequency information 12, based on the update information 21 included in the command information 14 acquired from the submission queue SQ, and can detect updating the command information 14 in the submission queue SQ more efficiently than the memory system 40 of the second comparative example.

Embodiment 1-B

An embodiment 1-B is a modified example of the embodiment 1-A. A concrete example of the update frequency information 12 will be described in the embodiment 1-B.

FIG. 7 is a diagram illustrating an example of a data configuration of the update frequency information 12.

The update frequency information 12 includes a queue ID 45 which designates the submission queue SQ, the number of to-be-updated information (the estimated number of updates) 46, and an information update count per unit time (the number of updates per unit time) 47.

When the processor 2 is connected to a plurality of memory systems 10 so as to be communicable therewith, the processor 2 manages the submission queue SQ corresponding to each of the memory systems 10. In addition, when the processor 2 is connected to one memory system 10 so as to be communicable therewith, the processor 2 may use a plurality of submission queues SQ.

The queue ID 45 uniquely designates a specific submission queue SQ of a plurality of submission queues SQ.

The number of to-be-updated information 46 is the number of command information 14 which the processor 2 is to update for the submission queue SQ. The polling controller 30 determines a polling finish condition, based on the number of to-be-updated information 46 of the submission queue SQ. For example, when the number of the command information 14 read from the submission queue SQ designated by the queue ID 45 corresponds to the number of to-be-updated information 46, the polling controller 30 stops polling or extends a polling interval.

The information update count per unit time 47 is the number of times of updating the command information 14 for the submission queue SQ per unit time by the processor 2. The polling controller 30 determines a frequency or a cycle of the polling, based on the information update count per unit time 47, to attempt optimization. For example, the polling controller 30 may optimize (determine) timing of reading the command information 14 from the submission queue SQ and the number of command information which is read at one timing, based on the information update count per unit time 47.

When the processor 2 detects that the number of occurrence of the command information 14 corresponds to the number of to-be-updated information 46, the processor 2 may generate new update frequency information and send the new update frequency information to the controller 7.

For example, when the number of to-be-updated information 46 and the information update count per unit time 47 are zero, they may designate that the submission queue SQ is not updated.

In the above-described embodiment 1-B, the processor 2 notifies the controller 7 of the update frequency information 12, and the update frequency information 12 includes the number of to-be-updated information 46 and the information update count per unit time 47. The controller 7 can thereby read an appropriate number of the command information 14 from the submission queue SQ, at an appropriate frequency.

Incidentally, the update frequency information 12 may include either of the number of to-be-updated information 46 and the information update count per unit time 47.

Embodiment 1-C

An embodiment 1-C is a modified example of the embodiment 1-B. A concrete example in which the DMAC 29 of the polling controller 30 executes DMA transfer of a set including a plurality of command information 14 from the submission queue SQ to the internal memory 27 of the controller 7 will be described in the embodiment 1-C.

FIG. 8 is a diagram illustrating an example of the command information 14 which is wholly subjected to DMA transfer from the submission queue SQ to the internal memory 27 of the controller 7.

To reduce opportunities at which the system bus 5 and the peripheral bus 6 become busy, the DMAC 29 of the polling controller 30 transfers a Command Information Set (CIS) from the submission queue SQ to the internal memory 27 of the controller 7, in response to a transfer (read) request. The CIS includes a predetermined number of command information 14 from the SQ head SQH of the submission queue SQ. The polling controller 30 maintains command information 14 designating that the update information 21 is updated among a plurality of command information 14 stored in the internal memory 27 of the controller 7, as a valid command, and discards command information 14 in which the update information 21 designates non-updating, as an in invalid command.

In the example of FIG. 8, the polling controller 30 maintains the command information 14 including update information "High" (1) and discards the command information 14 including update information "Low" (0).

The polling controller 30 optimizes the number of command information 14 which is read from the submission queue SQ at a time, based on the number of to-be-updated information 46 and the information update count per unit time 47 in the update frequency information 12.

As an example of optimizing, the polling controller 30 may set the number of command information 14 which are read at a time smaller than a predetermined number when the number of to-be-updated information 46 or the information update count per unit time 47 is smaller than a threshold value, and may set the number of command information 14 which are read at a time larger than a predetermined number when the number of to-be-updated information 46 or the information update count per unit time 47 is larger than or equal to a threshold value.

In the above-described embodiment 1-C, since the polling controller 30 reads a plurality of command information 14 read from the submission queue SQ at a time, the count of communication using the system bus 5 and the peripheral bus 6 can be reduced and the number of transactions of the bus can be reduced.

In the embodiment 1-C, the controller 7 can acquire an appropriate number of command information 14 from the host device 9 at an appropriate frequency and an appropriate count, based on the update frequency information 12. Further, the controller 7 can acquire the command information 14 with efficiency, based on the update frequency information 12. The controller 7 can reduce total times to acquire the command information 14 by acquiring the set including a plurality of command information 14.

Embodiment 1-D

In An embodiment 1-D, the update information 21 included in the command information 14 according to the embodiments 1-A to 1-C will be concretely described.

FIG. 9 is a diagram illustrating an example of statuses of the update information 21 included in the command information 14 stored in the submission queue SQ.

In FIG. 9, the update information 21 designating that the command information 14 is updated is referred to as "High" (1). The update information 21 designating that the command information 14 is non-updated is referred to as "Low" (0).

When writing the command information 14 to the location designated by the SQ tail SQT of the submission queue SQ, the processor 2 sets the update information 21 included in the command information 14 to "High".

The controller 7 reads the command information 14 from the location designated by the SQ head SQH of the submission queue SQ. Then, the controller 7 executes a clear operation of changing the update information 21 of the command information 14 in the location designated by the SQ head SQH from "High" to "Low".

Thus, when the command information 14 includes the update information 21 and when the processor 2 excludes mmio_write that notifies the controller 7 of updating, the controller 7 can determine whether the command information 14 in the submission queue SQ is already updated or not. For this reason, in the embodiment 1-D, a process load of the processor 2 can be reduced, IOPS can be made higher, and an efficiency of communication between the processor 2 and the memory system 10 can be improved.

Embodiment 1-E

An embodiment 1-E is a modified example of the embodiment 1-D. Management of the update information 21 which does not require the clear operation will be described in the embodiment 1-E.

Figure 10:
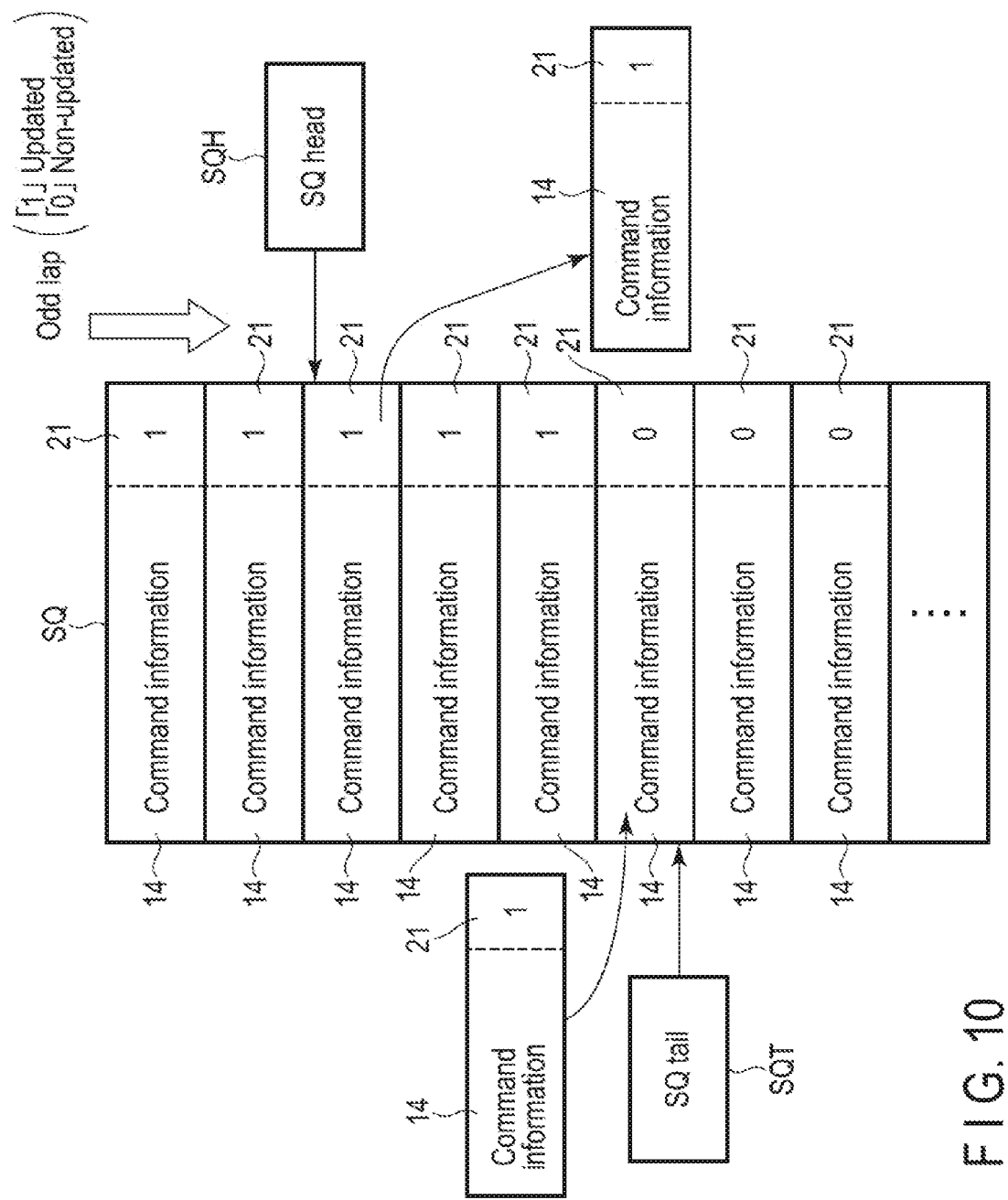
FIG. 10 is a diagram illustrating examples of the update information in the submission queue at an odd lap.

FIG. 10 is a diagram illustrating examples of the update information 21 in the submission queue SQ at an odd lap (1, 3, 5, . . . ).

The submission queue SQ according to the embodiment 1-E is a ring buffer. In the embodiment 1-E, a phase bit method of inverting and writing the update information 21 at each lap (round or circulation) of the submission queue SQ is applied.

The processor 2 initializes fields of the update information 21 in the submission queue SQ to "Low".

The processor 2 sets a content constituting the command information 14 at a location designated by the SQ tail SQT, at an odd lap, and inverts a field of the update information 21 at the location designated by the SQ tail SQT from "Low" to "High".

The controller 7 determines the update information 21 stored in the submission queue SQ at an odd lap as updating at "High" and determines the update information 21 as non-updating at "Low".

Figure 11:
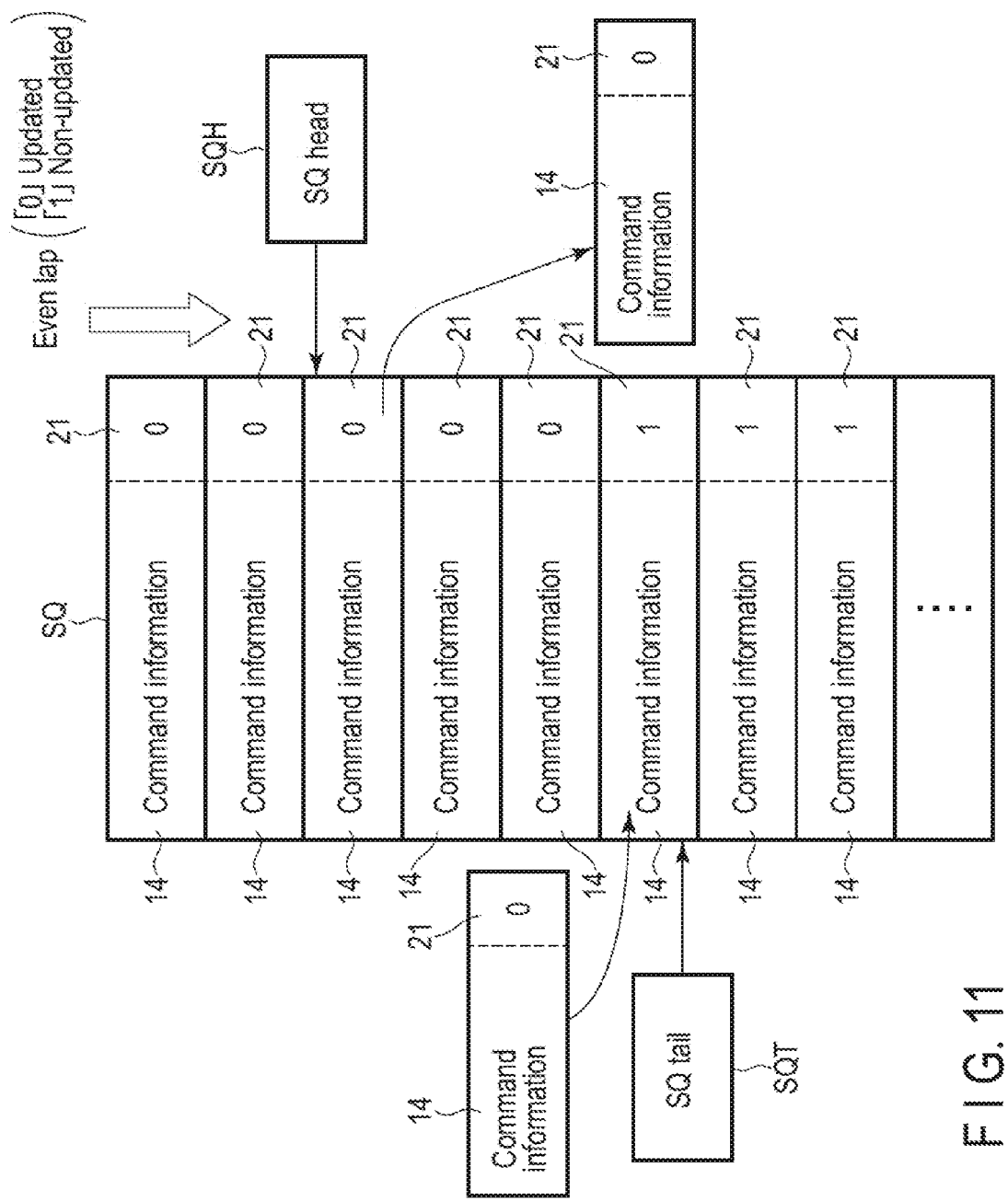
FIG. 11 is a diagram illustrating examples of the update information in the submission queue at an even lap.

FIG. 11 is a diagram illustrating examples of the update information 21 in the submission queue SQ at an even lap (2, 4, 6, . . . ).

The processor 2 sets the content constituting the command information 14 at a location designated by the SQ tail SQT, at an even lap, and inverts a field of the update information 21 at the location designated by the SQ tail SQT from "High" to "Low".

The controller 7 determines the update information 21 stored in the submission queue SQ at an even lap as updating at "LOW" and determines the update information 21 as non-updating at "High".

In the above-described embodiment 1-E, a status designating updating in the update information 21 is inverted in accordance with a lap of the submission queue SQ. The controller 7 inverts a criterion of determining whether the update information 21 is updated or not in accordance with a lap of the submission queue SQ.

In the embodiment 1-E, the controller 7 may not execute the clear operation for the update information 21 at the location designated by the SQ head SQH after reading the command information 14 from the location designated by the SQ head SQH of the submission queue SQ.

Therefore, in the embodiment 1-E, the clear operation of the update information 21 by the controller 7 is unnecessary, a read operation of the command information 14 is not blocked on the peripheral bus 6, and the command information 14 can be read at appropriate timing or interval based on the update frequency information 12, as compared with a case of the above-described embodiment 1-D in which the controller 7 executes the clear operation.

Embodiment 2-A

In an embodiment 2-A, completion information (for example, completion flag) is stored in an area determined based on command information 14 stored in a submission queue SQ or a management unit of the submission queue SQ, instead of a completion queue CQ.

The embodiment 2-A may be applied in combination with the embodiments 1-A to 1-E.

Figure 12:
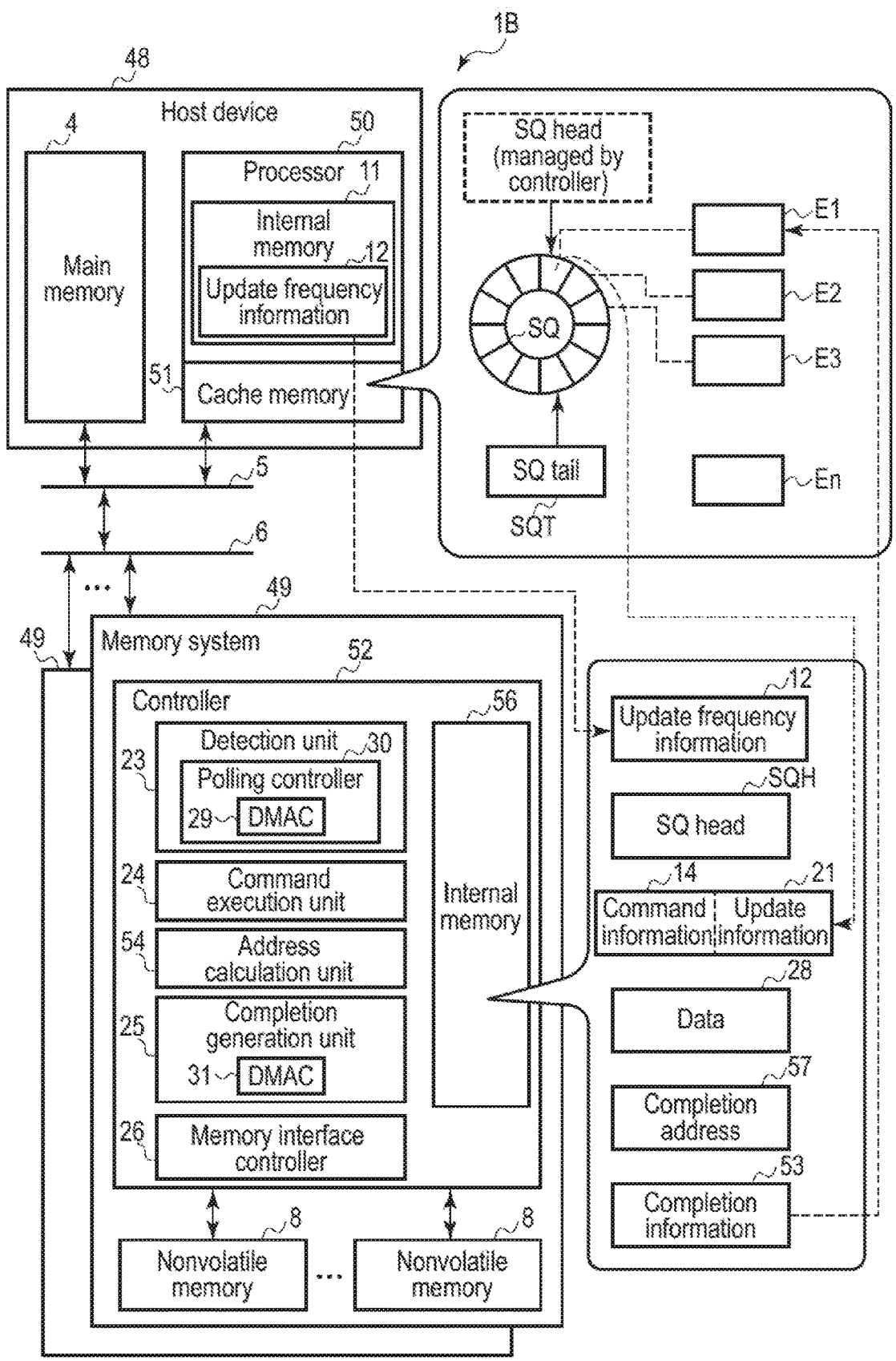
FIG. 12 is a block diagram illustrating an example of a configuration of a storage system according to an embodiment 2-A.

FIG. 12 is a block diagram illustrating an example of a configuration of a storage system 1B according to the embodiment 2-A.

The storage system 1B includes a host device 48, the system bus 5, the peripheral bus 6, and a memory system 49.

The host device 48 includes a processor 50, a cache memory 51, and the main memory 4.

The memory system 49 includes a controller 52 and the nonvolatile memories 8.

The cache memory 51 includes the submission queue SQ and a plurality of areas E1 to En where completion information 53 is stored.

In the embodiment 2-A, a data size of the completion information 53 may be smaller than a size of the completion information 15 described in the embodiment 1-A. For example, the completion information 53 may be 1 bit. In this case, it is designated by 1 bit whether one command is completed or not.

A location of each of the areas E1 to En is determined from the command information 14 stored in the submission queue SQ or each management unit of the submission queue SQ. In other words, each of the areas E1 to En is uniquely associated with the command information 14 in the submission queue SQ or the management unit.

The processor 50 determines, acquires, or calculates each of addresses designating each of the areas E1 to En, and prepares or allocates the areas E1 to En.

In the embodiment 2-A, information of 1 bit at the minimum may be able to be stored in each of the areas E1 to En.

The controller 52 includes the detection unit 23, the command execution unit 24, an address calculation unit 54, a completion generation unit 55, the memory interface controller 26, and an internal memory 56 of the controller 52.

The internal memory 56 of the controller 52 stores update frequency information 12 notified by the processor 50, the SQ head SQH, the command information 14 which is read from the submission queue SQ, data 28, a completion address 57, and completion information 53 corresponding to the command information 14. The internal memory 56 of the controller 52 may be, for example, a register.

The address calculation unit 54 calculates the completion address 57 designating the area E1 which is to be a write destination of the completion information 53 designating completion of executing a command corresponding to the command information 14, and writes the completion address 57 to the internal memory 56 of the controller 52. Incidentally, order of writing the completion information 53 to the areas E1 to En may be different from order of reading the command information 14 corresponding to the completion information 53.

The completion generation unit 55 includes the DMAC 31. The completion generation unit 55 generates the completion information 53 after execution of the command, and writes the completion information 53 to the internal memory 56 of the controller 52. The DMAC 31 transfers the completion information 53 from the internal memory 56 of the controller 52 to the area E1 designated by the completion address 57.

The processor 50 determines whether the command corresponding to the command information 14 is completed or not, by reading the completion information 53 from the area E1 determined from the command information 14 in the submission queue SQ or the management unit of the submission queue SQ.

A process executed by the storage system 1B according to the embodiment 2-A including the above-described configuration will be described below.

Figure 13:
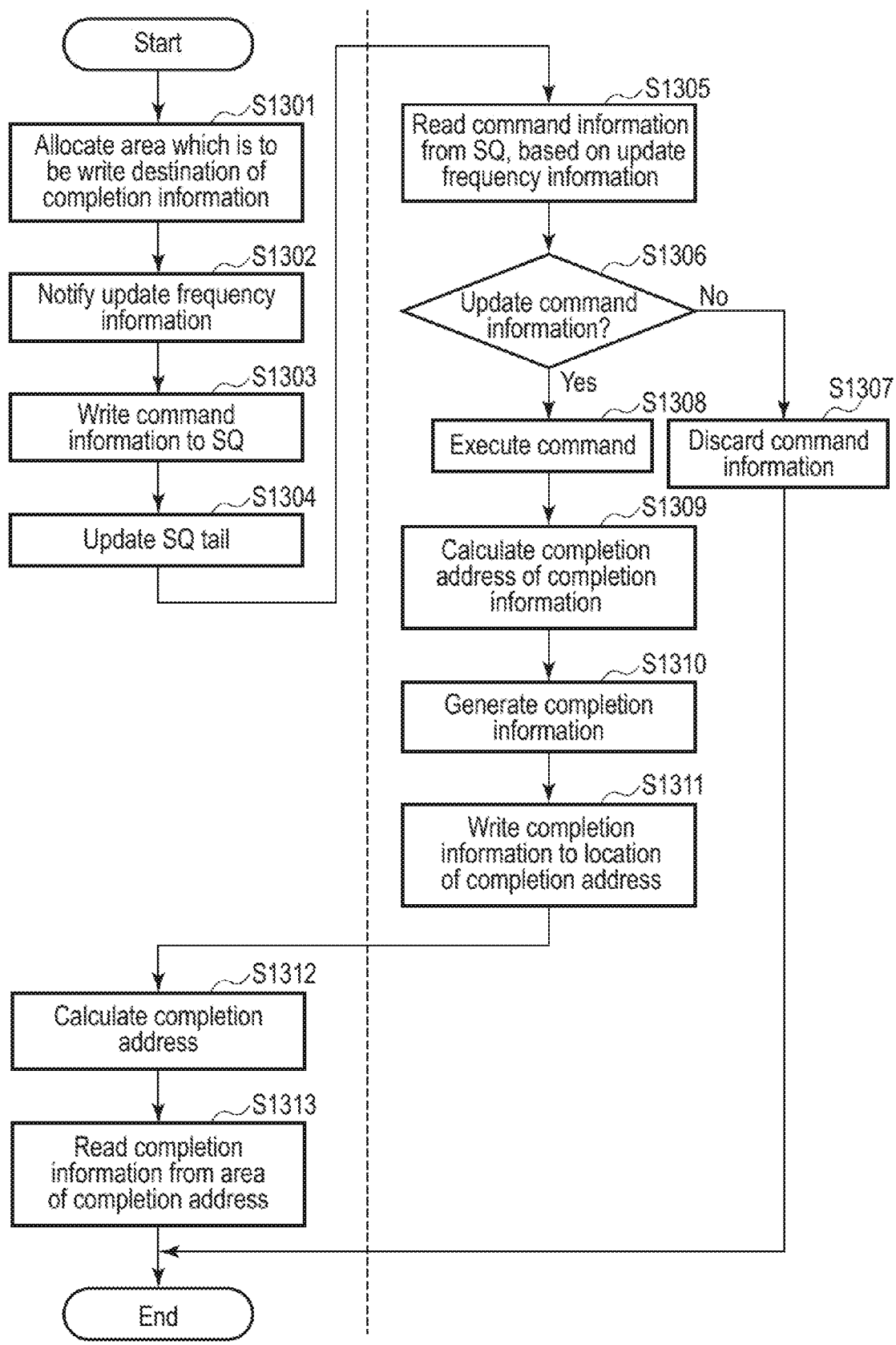
FIG. 13 is a flowchart illustrating an example of a process executed by the storage system according to the embodiment 2-A.

FIG. 13 is a flowchart illustrating an example of a process executed by the storage system 1B according to the embodiment 2-A.

The processor 50 calculates an address of the areas E1 to En determined from the command information 14 stored in the submission queue SQ or the management unit of the submission queue SQ, and allocates the areas E1 to En in the cache memory 51. The areas E1 to En become write destinations of the completion information 53 (S1301).

Since steps S1302 to S1308 of FIG. 13 are the same as steps S301 to S307 of FIG. 3, descriptions of the steps S1302 to S1308 will be omitted.

The address calculation unit 54 calculates the completion address 57 designating the area E1 which is to be the write destination of the completion information 53, and writes the completion address 57 to the internal memory 56 of the controller 52 (S1309).

The completion generation unit 55 generates the completion information 53, and writes the completion information 53 to the internal memory 56 of the controller 52 (S1310).

The DMAC 31 of the completion generation unit 55 transfers the completion information 15 from the internal memory 56 of the controller 52 to the area E1 designated by the completion address 57. The completion information 15 is thereby written to the location designated by the completion address 57 (S1311).

The processor 50 calculates the completion address 57 from the command information 14 of the submission queue SQ or the management unit of the submission queue SQ (S1312), reads the completion information 53 stored in the area E1 designated by the completion address 57, and determines completion of a command (S1313).

Incidentally, address calculation in S1312 may be omitted when the completion address 57 is already calculated in S1301.

The storage system 1B according to the above-described embodiment 2-A writes the completion information 53 in the area E1 uniquely determined from the command information 14 of the submission queue SQ or the management unit of the submission queue SQ. In the embodiment 2-A, a data size of one completion information 53 corresponding to one command information 14 can be made smaller, for example, 1 bit, and a use amount of the cache memory 51 can be reduced.

In the embodiment 2-A, since the completion queue CQ is not used, a process load of the processor 50 and the controller 52 for the CQ head CQH and the CQ tail CQT can be reduced. The processor 50 can acquire the completion information 53 corresponding to the command information 14 at one access to the cache memory 51, and can simplify completion control. The storage system 1B according to the embodiment 2-A can stably achieve IOPS as high as a DRAM or an SRAM.

Features of the storage system 1B according to the embodiment 2-A will be hereinafter described in comparison with the storage system C2 of the second comparative example illustrated in FIG. 6.

In the storage system C2 of the second comparative example, it is determined that a read command is completed when it is detected that the data buffer memory 43 is updated by the read data 44. Thus, the storage system C2 of the second comparative example simplifies completion control only when the read command is executed.

In addition, in the storage system C2 of the second comparative example, when, for example, the read data 44 having the same content as an initialization status are written to the data buffer memory 43, updating the data buffer memory 43 cannot be detected appropriately depending on the content of the read data 44, and completion of the read command cannot be determined appropriately.

In contrast, the storage system 1B according to the embodiment 2-A can simplify completion control not only at execution of a read command, but at execution of various types of commands. In addition, the storage system 1B according to the embodiment 2-A can determine a command completion without being influenced by a content of the read data 44.

A completion of a read command is determined by using the read data 44 in the storage system C2 of the second comparative example. In contrast, in the storage system 1B according to the embodiment 2-A, since a command completion is determined based on not the read data, but the completion information 53, the degree of freedom of the completion information 53 can be improved.

Features of the storage system 1B according to the embodiment 2-A will be hereinafter described in comparison with a storage system C3 of a third comparative example.

FIG. 14 is a block diagram illustrating an example of a configuration of the storage system C3 according to the third comparative example.

In the storage system C3 of the third comparative example, the processor 34 and the memory system 33 operate according to the NVMe standard.

The processor 34 of the third comparative example accesses the cache memory 35 in completion control corresponding to a read command.

The cache memory 35 includes the submission queue SQ and the completion queue CQ.

The completion information 15 is assumed to be, for example, 16 bytes.

The processor 34 reads the completion information 15 from a location designated by the CQ head CQH of the completion queue CQ, in completion control corresponding to a read command.

When it is designated that the status information 22 of the completion information 15 is updated, the processor 34 acquires the host address 19 of the read data corresponding to the command ID 16, based on the command information 38 including the same command ID 16 as the command ID 16 of the completion information 15. Then, the processor 34 loads the read data at the location designated by the host address 19.

The processor 34 updates the value of the CQ head CQH and notifies the memory system 33 of the CQ head CQH (mmio_write "CQ Head").

To achieve performance of 50 mega IOPS in the storage system C3 according to the third comparative example, the above completion control should desirably be completed in several nanoseconds.

However, a waiting state of approximately 100 nanoseconds may be generated at mmio_write "CQ Head", and completing the completion control of the third comparative example in several nanoseconds may be difficult.

In addition, in the storage system C3 of the third comparative example, 16 bytes are required for one completion information 15 corresponding to one command information 14.

The improvement in performance of the storage system C3 can be attempted by arranging a plurality of memory systems 33 in parallel. In this case, however, load on each processor 34 is increased and a use amount of the cache memory 35 is also increased.

In contrast, in the embodiment 2-A, a process load of one processor 50 can be reduced by excluding mmio_write "CQ Head".

In addition, in the completion control of the storage system 1B according to the embodiment 2-A, a data size of the completion information 53 can be reduced and a use amount of the cache memory 51 can be reduced.

The storage system 1B according to the embodiment 2-A can therefore stably achieve IOPS as high as a DRAM or an SRAM.

Embodiment 2-B

An embodiment 2-B is a modified example of the embodiment 2-A. A first arrangement example of completion information 53 in the cache memory 51 will be described in the embodiment 2-B.

Figure 15:
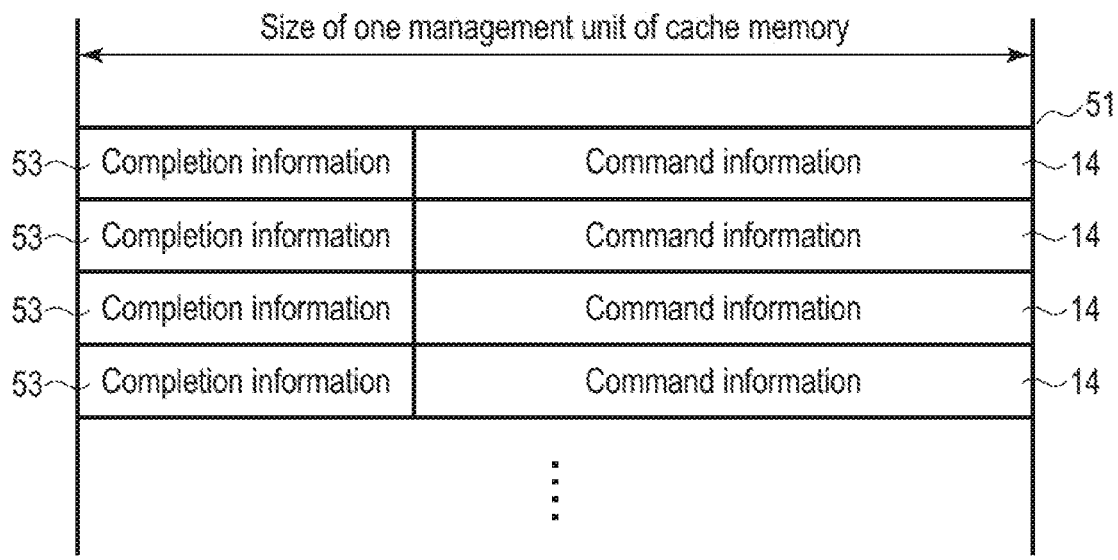
FIG. 15 is a diagram illustrating an example of an arrangement relationship between command information and completion information in a cache memory according to an embodiment 2-B.

FIG. 15 is a diagram illustrating an example of an arrangement relationship between the command information 14 and the completion information 53 in the cache memory 51 according to the embodiment 2-B.

A size of the management unit (load unit) of the cache memory 51 is assumed to be, for example, 64 bytes. One management unit of the cache memory 51 may be referred to as a cache line.

The command information 14 of the submission queue SQ and the completion information 53 corresponding to the command information 14 are arranged in the same management unit of the cache memory 51.

For example, a High Enable method is applied to the embodiment 2-B.

More specifically, the completion information 53 designates incompletion at "Low" and designates completion at "High".

The processor 50 writes the command information 14 to the area of the management unit of the cache memory 51 and, simultaneously, writes "Low" to the completion information 53 as clear operation.

When a command is completed, the controller 52 writes "High" to the completion information 53 in the management unit in the cache memory 51. In the embodiment 2-B, the controller 52 writes the completion information 53 corresponding to the command information 14 to the same management unit as that of the command information 14 of the cache memory 51. In this case, the controller 52 may write back a value of the command information 14 such that the command information 14 in the management unit is not changed, or may write the other value.

The processor 50 determines completion or incompletion of the command in accordance with "High" or "Low" status of the completion information 53 stored in the area in the same management unit as that of the command information 14.

In the above-described embodiment 2-B, since the command information 14 and the completion information 53 corresponding to the command information 14 are written to the area of the same management unit of the cache memory 51, there is no need to consume an area of new management unit for the completion information 53.

Therefore, in the embodiment 2-B, a use amount of the cache memory 51 can be reduced and the access to the cache memory 51 can be executed efficiently.

In addition, in the embodiment 2-B, the address calculation unit 54 described in the embodiment 2-A can be deleted and the configuration and operations of the controller 52 can be simplified.

Embodiment 2-C

An embodiment 2-C is a modified example of the embodiment 2-A.

Figure 16:
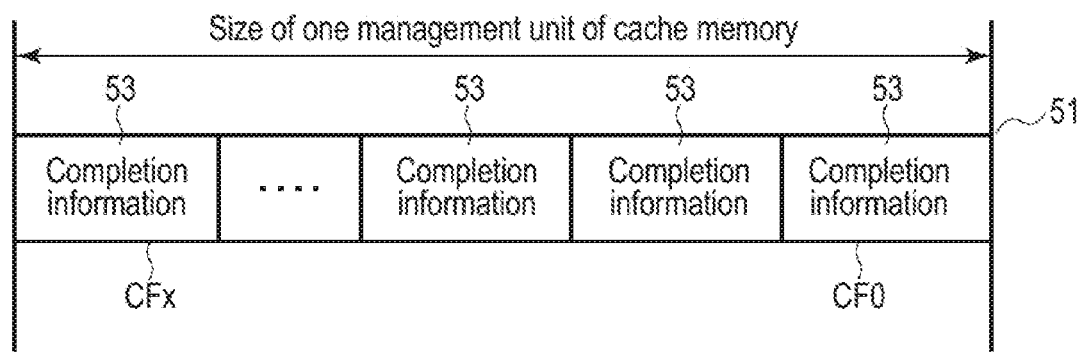
FIG. 16 is a diagram illustrating an arrangement example of completion information in a cache memory according to an embodiment 2-C.

FIG. 16 is a diagram illustrating an arrangement example of the completion information 53 in the cache memory 51 according to the embodiment 2-C.

A plurality of completion information 53 may be arranged in one management unit of the cache memory 51. In this case, the processor 50 can read the plurality of completion information 53 at a time from the cache memory 51. In addition, the controller 52 can write the plurality of completion information 53 at a time to the cache memory 51.

In the embodiment 2-C, the controller 52 desirably employs a phase bit method when the completion information 53 is changed to designate completion or incompletion.

In the embodiment 2-C, a head bit of one management unit of the cache memory 51 is referred to as CF0 and a tail bit (most significant bit) thereof is referred to as CFx. The controller 52 sequentially updates the completion information 53 in the management unit of the cache memory 51 from CF0 to CFx and, when repeating again updating from the head bit CF0 to the tail bit CFx, inverts the completion information 53. Thus, the controller 52 inverts the completion information 53, at each sequence from CF0 to CFx, and synchronously inverts a determination criterion of completion and incompletion at an odd lap and an even lap. Order of completion of a command in the controller 52 may be different from order of updating the completion information 53.

The processor 50 determines completion or incompletion of a command, based on the completion information 53 in the management unit of the cache memory 51 and a sequence count (round count).

As another method in the embodiment 2-C, the controller 52 inverts the completion information 53 in the management unit of the cache memory 51 in accordance with the order of completing the command.

The processor 50 determines completion or incompletion of the command, based on the update count of each bits corresponding to the completion information 53 in the management unit of the cache memory 51.

In the above-described embodiment 2-C, since a set includes a plurality of completion information 53 can be written or read, access count to the cache memory 51 can be reduced and a process load of the processor 50 can be reduced.

Embodiment 2-D

An embodiment 2-D is a modified example of the embodiment 2-A. In the embodiment 2-D, the command information 14 is associated with the completion information 53 by providing a field for storing a completion address 57 in a management unit of the submission queue SQ.

Figure 17:
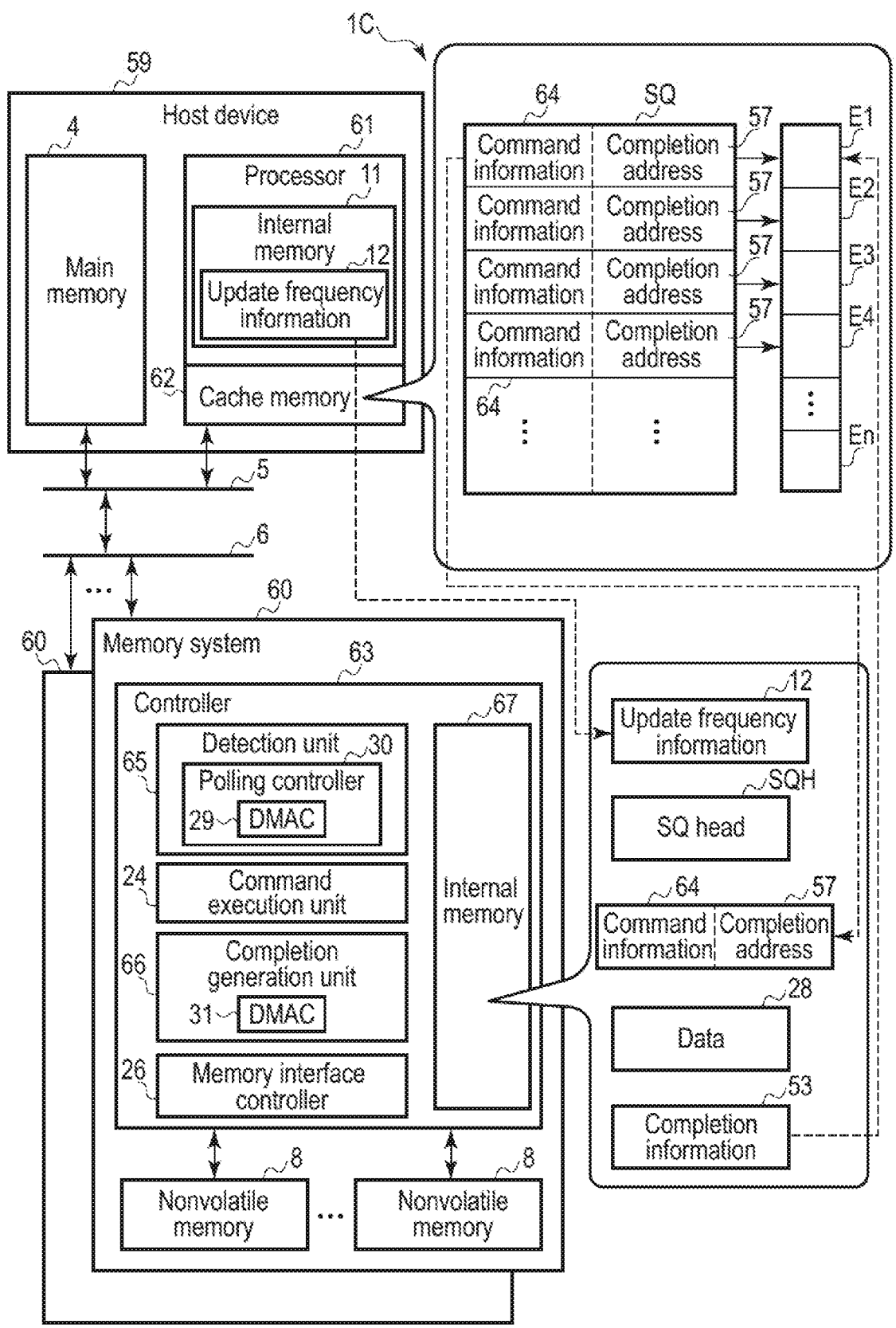
FIG. 17 is block diagram illustrating an example of a configuration of a storage system according to an embodiment 2-D.

FIG. 17 is a block diagram illustrating an example of a configuration of a storage system 1C according to the embodiment 2-D.

The storage system 1C includes a host device 59, the system bus 5, the peripheral bus 6, and a memory system 60.

The host device 59 includes a processor 61, a cache memory 62, and the main memory 4.

The memory system 60 includes a controller 63 and the nonvolatile memories 8.

The cache memory 62 includes the submission queue SQ and areas E1 to En.

Command information 64 stored in the submission queue SQ includes a field where the completion address 57 designating a location of a storing destination of the completion information 53 corresponding to the command information 64 is stored. More specifically, the command information 64 stored in the submission queue SQ includes, for example, information such as the command ID 16, the operation code 17, the data length 18, the host address 19 and the memory address 20, and the completion address 57.

The controller 63 includes a detection unit 65, the command execution unit 24, a completion generation unit 66, the memory interface controller 26, and an internal memory 67 of the controller 63.

The internal memory 67 of the controller 63 stores the update frequency information 12, the SQ head SQH, the command information 64 which is read from the submission queue SQ, the data 28, and the completion information 53.

The detection unit 65 includes a polling controller 30. The detection unit 65 reads the command information 64 including the completion address 57 from the submission queue SQ designated by the SQ head SQH, and writes the command information 64 to the internal memory 67 of the controller 63.

The completion generation unit 66 generates the completion information 53 after execution of the command, and writes the completion information 53 to the internal memory 67 of the controller 63. The DMAC 31 of the completion generation unit 66 transfers the completion information 53 to the area E1 in the cache memory 62 designated by the completion address 57 included in the command information 64.

The processor 61 determines whether the command corresponding to the command information 64 is completed or not, by reading the completion information 53 from the area E1 designated by the completion address 57 included in the command information 64 in the submission queue SQ.

In the above-described embodiment 2-D, the processor 61 can freely designate the completion address and store the completion information 53 in a free area.

Embodiment 2-E

An embodiment 2-E is a modified example of the embodiment 2-A. An arrangement example of read data and completion information 53 will be described in the embodiment 2-E.

Figure 18:
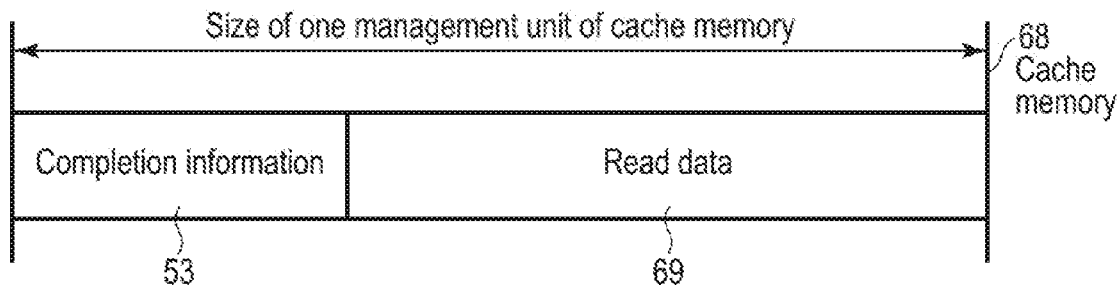
FIG. 18 is a diagram illustrating an example of a first arrangement relationship between read data and completion information in a cache memory according to an embodiment 2-E.

FIG. 18 is a diagram illustrating an example of a first arrangement relationship between read data 69 and the completion information 53 in a cache memory 68 according to the embodiment 2-E.

In the first arrangement relationship, the read data 69 and the completion information 53 are arranged in one management unit of the cache memory 68. In the first arrangement relationship, the completion information 53 is arranged at a head location of the read data 69. Oppositely, however, the completion information 53 may be arranged at a tail location of the read data 69.

Figure 19:
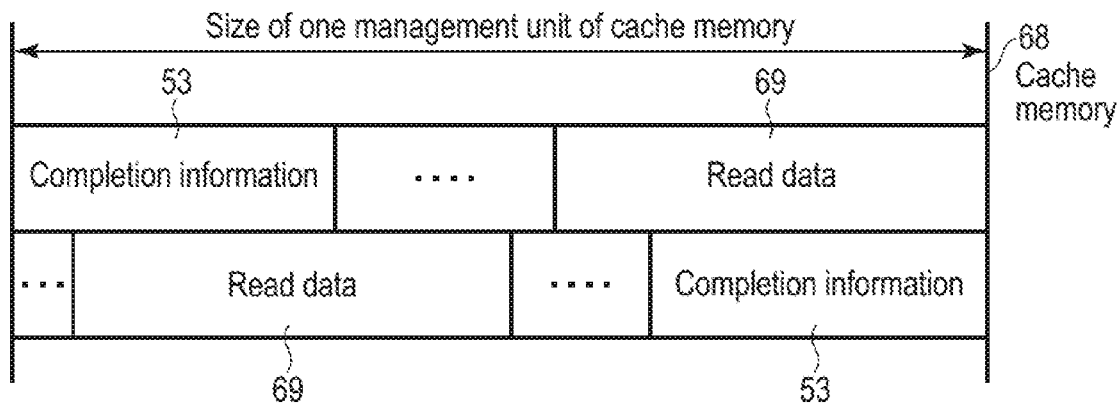
FIG. 19 is a diagram illustrating an example of a second arrangement relationship between read data and completion information in the cache memory according to the embodiment 2-E.

FIG. 19 is a diagram illustrating an example of a second arrangement relationship between the read data 69 and the completion information 53 in the cache memory 68 according to the embodiment 2-E.

In the second arrangement relationship, the read data 69 and the completion information 53 are arranged separately each other in one management unit of the cache memory 68.

Figure 20:
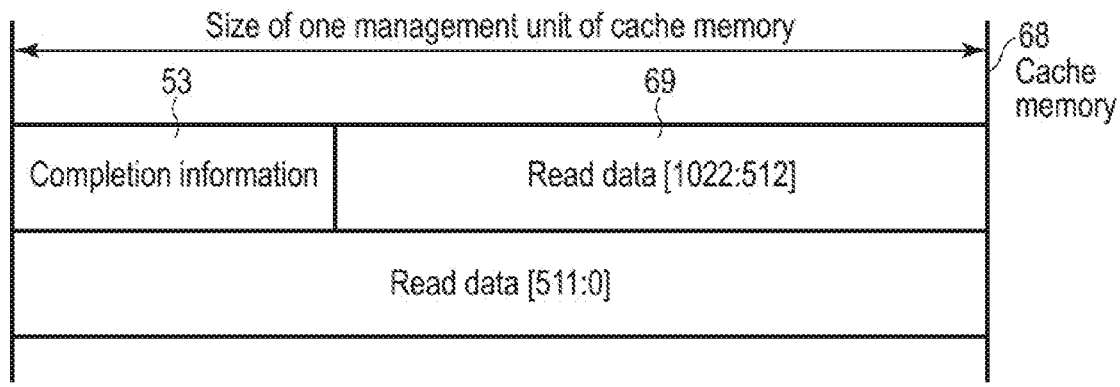
FIG. 20 is a diagram illustrating an example of a third arrangement relationship between read data and completion information in the cache memory according to the embodiment 2-E.

FIG. 20 is a diagram illustrating an example of a third arrangement relationship between the read data 69 and the completion information 53 in the cache memory 68 according to the embodiment 2-E.

In the third arrangement relationship, the read data 69 and the completion information 53 are arranged in a plurality of management units of the cache memory 68.

In the embodiment 2-E, the processor 50 can simultaneously read the read data 69 corresponding to the read command and the completion information 53 corresponding to the read command, from the cache memory 68. Thus, the number of times of access to the cache memory 68 executed by the processor 50 can be reduced and a process load of the processor 50 can be reduced.

In addition, in the embodiment 2-E, the host address 19 which is the write destination of the read data 69 can be used as the address of the write destination of the completion information 53, the address calculation unit 54 described in the embodiment 2-A can be deleted from the controller 52, and the configuration and operations of the controller 52 can be simplified.

Embodiment 2-F

An embodiment 2-F is a modified example of the embodiment 2-A. In the embodiment 2-F, a completion address 57 is calculated based on an index allocated to the management unit of the submission queue SQ, a base address, and a stride (interval).

Figure 21:
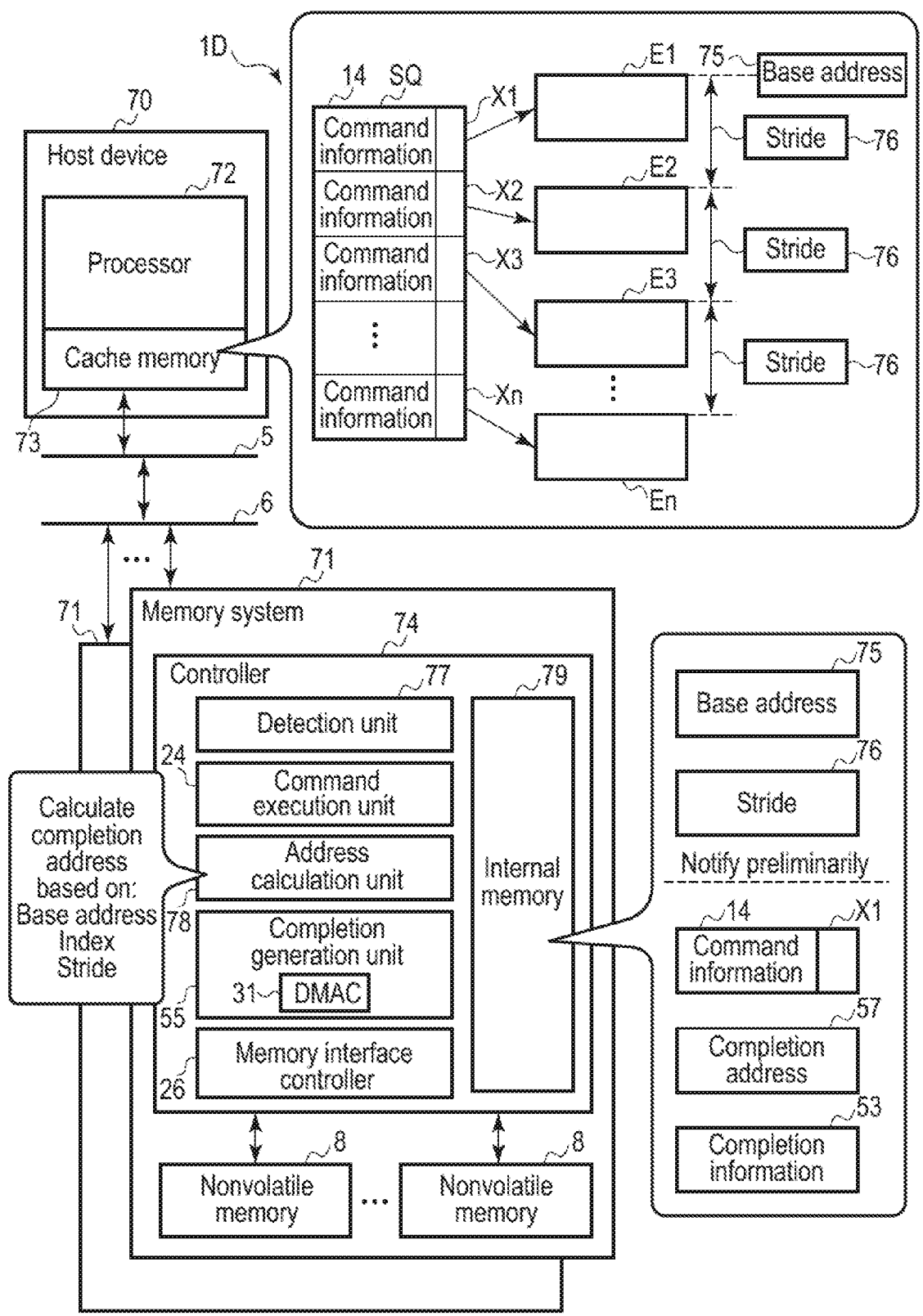
FIG. 21 is a block diagram illustrating an example of a configuration of a storage system according to an embodiment 2-F.

FIG. 21 is a block diagram illustrating an example of a configuration of a storage system 1D according to the embodiment 2-F.

The storage system 1D includes a host device 70, the system bus 5, the peripheral bus 6, and a memory system 71.

The host device 70 includes a processor 72 and a cache memory 73.

The memory system 71 includes a controller 74 and the nonvolatile memories 8.

The cache memory 73 includes the submission queue SQ and the areas E1 to En where the completion information 53 is stored.

Indexes X1 to Xn for improving the efficiency of access are allocated to respective management units of the submission queue SQ.

The areas E1 to En where the completion information 53 is stored are arranged based on the indexes X1 to Xn of respective management units, a base address 75, and a stride (interval) 76. More specifically, each of addresses of the areas E1 to En is calculated by a function using each of the indexes X1 to Xn, the base address 75, and the strides 76 as arguments.

For example, the processor 72 determines the base address 75 and the stride 76 used when the completion information 53 is stored in the cache memory 73, and notifies the controller 74 of the base address 75 and the strides 76 in advance (for example, during a period after the storage system 1D starts up and until the command is issued).

The controller 74 includes a detection unit 77, the command execution unit 24, an address calculation unit 78, the completion generation unit 55, the memory interface controller 26, and an internal memory 79 of the controller 74.

The internal memory 79 of the controller 74 stores the base address 75, the stride 76, the command information 14, the index X1, the completion address 57, and the completion information 53.

The detection unit 77 writes the base address 75 and the stride 76 notified by the processor 72 to the internal memory 79 of the controller 74.

The detection unit 77 holds the index information X1 and writes the index X1 to the internal memory 79 at time of reading the command information 14. In addition, the detection unit 77 reads the command information 14 from the submission queue SQ, and writes the command information 14 to the internal memory 79 of the controller 74.

The address calculation unit 78 calculates the completion address 57, based on the base address 75, the index X1, and the stride 76, and writes the completion address 57 to the internal memory 79 of the controller 74. For example, the address calculation unit 78 calculates completion address 57=base address 75+(index X1×stride 76).

The completion generation unit 55 includes the DMAC 31. The completion generation unit 55 generates the completion information 53 and writes the completion information 53 to the internal memory 79 of the controller 74 after execution of the command. The DMAC 31 transfers the completion information 53 from the internal memory 79 of the controller 74 to the area E1 designated by the completion address 57.

The processor 72 determines whether the command corresponding to the command information 14 is completed or not, by calculating the completion address 57, based on the index X1 of the command information 14 stored in the submission queue SQ, the base address 75, and the stride 76, and reading the completion information 53 from the area E1 designated by the completion address 57.

In the above-described embodiment 2-F, the areas E1 to En where the completion information 53 is stored have an arrangement structure set based on the indexes X1 to Xn of the submission queue SQ, the base address 75, and the strides 76.

In the embodiment 2-F, the processor 72 statistically determines the dedicated area E1 corresponding to the management unit of the submission queue SQ, and the controller 74 calculates the address of the area E1.

Therefore, in the embodiment 2-F, completion control which does not use the completion queue CQ can be executed.

In the embodiment 2-F, since the completion addresses 57 to designate the areas E1 to En do not need to be added to all the command information 14, unlike the embodiment 2-D, a use amount of the cache memory 73 can be reduced.

Incidentally, in the embodiment 2-F, each of the indexes X1 to Xn may be location information of each of the management units of the submission queue SQ or may be each of sequential numbers for the management units of the submission queue SQ.

In the embodiment 2-F, each of the indexes X1 to Xn may be the command ID 16 in the command information 14.

In the embodiment 2-F, when the location information of the submission queue SQ is used for the calculation of the completion addresses 57, the command information 14 may not have a field for storage of the location information.

Embodiment 2-G

An embodiment 2-G is a modified example of the embodiment 2-A. In the embodiment 2-G, completion information includes additional information (hereinafter referred to as attribute information) in addition to information designating completion or incompletion of the command.

FIG. 22 is a block diagram illustrating an example of a configuration of a storage system 15 according to the embodiment 2-G.

In the embodiment 2-G, completion information 80 includes information (for example, bit information) designating completion or incompletion of a command, and attribute information 81.

The attribute information 81 may include, for example, a status of NVMe, error information, a command execution result, read data, and other auxiliary information.

A storage system 1E includes a host device 82, the system bus 5, the peripheral bus 6, and a memory system 83.

The host device 82 includes a processor 84, a cache memory 85, and the main memory 4.

The memory system 83 includes a controller 86 and the nonvolatile memories 8.

The controller 86 includes the detection unit 23, the command execution unit 24, the address calculation unit 54, a completion generation unit 87, the memory interface controller 26, and an internal memory 88 of the controller 86.

The internal memory 88 of the controller 86 stores the update frequency information 12, the SQ head SQH, the command information 14, the data 28, the completion address 57, and the completion information 80.

The completion generation unit 87 includes the DMAC 31. The completion generation unit 87 generates the completion information 80 including the attribute information 81 and writes the completion information 80 to the internal memory 88 of the controller 86 after execution of the command. The DMAC 31 transfers the completion information 80 from the internal memory 88 of the controller 86 to the area E1 designated by the completion address 57.

The processor 84 can read the command information 80 in the area E1, and execute various processes based on the determination on the completion or incompletion of the command and the attribute information 81. The processor 84 may issue a rewrite command, for example, when detecting a write error.

In the above-described embodiment 2-G, the processor 84 can obtain not only the information on whether the command is completed or not, but various information from the completion information 80, and can implement, for example, a function which can be implemented when the command is completed, such as an appropriate error process.

Embodiment 3-A

In an embodiment 3-A, a storage system which reduces a use amount of a cache memory by reducing a data size of command information and reduces a process load of a processor will be described.

The embodiment 3-A can be applied in combination with the embodiments 1-A to 2-G. A configuration of a controller will be simplified in each of the following embodiments but the controller may appropriately include a detection unit, a command execution unit, an address calculation unit, a completion generation unit, a memory interface controller, an internal memory, and the like, similarly to the embodiments 1-A to 2-G.

FIG. 23 is a block diagram illustrating an example of a configuration of a storage system 1F according to the embodiment 3-A.

The storage system 1F includes a processor 89, a cache memory 90, and a memory system 91. The memory system 91 includes a controller 92 and the nonvolatile memories 8.

The cache memory 90 includes submission queues SQ1 to SQ3.

The processor 89 sets (associates) an operation code OP1 and a data length DL1 that can be used as parts of the command information 38, for the submission queue SQ1, and notifies the controller 92 of information 133A designating that the operation code OP1 and the data length DL1 are set for the submission queue SQ1 in advance (for example, during a period after the storage system 1F starts up and until a command is issued, before the submission queue SQ1 is used, or before command information is written to the submission queue SQ1). The data length DL1 is a data length of data to be handled by a command designated by the operation code OP1. For example, when the operation code OP1 designates a write command, the data length DL1 is a data length of write data.

Since the operation code OP1 and the data length DL1 are set for the submission queue SQ1, the operation code 17 and the data length 18 are omitted in the command information I1 stored in the submission queue SQ1. Therefore, the command information I1 does not include the operation code 17 and the data length 18, but includes the command ID 16, the host address 19, and the memory address 20.

When issuing a command corresponding to the operation code OP1 and the data length DL1, the processor 89 writes the command information I1 to the location designated by an SQ tail SQT of the submission queue SQ1.

When reading the command information I1 from the location designated by an SQ head SQH of the submission queue SQ1, the controller 92 executes a command, based on the command information I1, and the operation code OP1 and the data length DL1 set in the submission queue SQ1.

The processor 89 sets an operation code OP2 and a data length DL2 for the submission queue SQ2, and notifies the controller 92 of information 133B designating that the operation code OP2 and the data length DL2 are set for the submission queue SQ2 in advance (for example, during a period after the storage system 1F starts up and until a command is issued, before the submission queue SQ2 is used, or before command information is written to the submission queue SQ2). The data length DL2 is a data length of data to be handled by a command designated by the operation code OP2. For example, when the operation code OP2 designates a read command, the data length DL2 is a data length of read data.

Since the operation code OP2 and the data length DL2 are set for the submission queue SQ2, the operation code 17 and the data length 18 are omitted in the command information I2 stored in the submission queue SQ2. Therefore, the command information I2 does not include the operation code 17 and the data length 18, but includes the command ID 16, the host address 19, and the memory address 20.

When issuing a command corresponding to the operation code OP2 and the data length DL2, the processor 89 writes the command information I2 to the location designated by an SQ tail SQT of the submission queue SQ2.

When reading the command information I2 from the location designated by an SQ head SQH of the submission queue SQ2, the controller 92 executes a command, based on the command information I2, and the operation code OP2 and the data length DL2 set in the submission queue SQ2.

When issuing the other command which is different from the command corresponding to the operation code OP1 and the data length DL1 and the command corresponding to the operation code OP2 and the data length DL2, the processor 89 writes the command information 38 related to the other command to a submission queue SQ3.

Incidentally, when issuing the command corresponding to the operation code OP1 and the data length DL1 or the command corresponding to the operation code OP2 and the data length DL2, the processor 89 may write the command information 38 related to the command to the submission queue SQ3.

The standard command information 38 stored in the submission queue SQ includes the command ID 16, the operation code 17, the data length 18, the host address 19, and the memory address 20.

When issuing a command which is not the command corresponding to the operation code OP1 and the data length DL1 and which is not the command corresponding to the operation code OP2 and the data length DL2, the processor 89 writes the command information 38 to the location designated by an SQ tail SQT of the submission queue SQ3.

When reading the command information 38 from the location designated by an SQ head SQH of the submission queue SQ3, the controller 92 executes a command, based on the command information 38.

In the above-described embodiment 3-A, the operation code OP1 and the data length DL1 are associated to the submission queue SQ1, and the operation code OP2 and the data length DL2 are associated to the submission queue SQ2, and the operation code 17 and the data length 18 are deleted in each of the command information I1 and I2 stored in the submission queues SQ1 and SQ2.

Thus, the operation code 17 and the data length 18 do not need to be set for each of the command information I1 and I2, a process load of the processor 89 can be reduced, and a use amount of the cache memory 90 can be reduced.

Incidentally, when a data size of the command information I1 and a data size of the command information I2 are smaller than or equal to one data size handled by an instruction or one data size handled by an extended instruction of the processor 89, the processor 89 can write each of the command information I1 and I2 to each of the submission queues SQ1 and SQ2 by only one instruction. For example, since the command information I1 and I2 includes the command ID 16, the host address 19, and the memory address 20, the data size of the command information I1 and the data size of the command information I2 are assumed to be larger than or equal to 32 bits. In addition, one data size handled by the instruction of the processor 89 is assumed to be 64 bits. In this case, in the embodiment 3-A, a process efficiency of the processor 89 can be improved by setting the data size of the command information I1 and the data size of the command information I2 to be smaller than or equal to one data size handled by the instruction or one data size handled by the extended instruction of the processor 89, for example, a range from 32 bits to 128 bits. Incidentally, command information I3 to I7 described in embodiments 3-B to 3-G to be described below may also be in a range from 32 bits to 128 bits.

Embodiment 3-B

An embodiment 3-B is a modified example of the embodiment 3-A. In the embodiment 3-B, the command ID 16 is deleted in the command information stored in the submission queue SQ.

FIG. 24 is a block diagram illustrating an example of a configuration of a storage system 1G according to the embodiment 3-B.

The storage system 1G includes a processor 93, a cache memory 94, and a memory system 95. The memory system 95 includes a controller 96 and the nonvolatile memories 8.

The cache memory 94 includes the submission queue SQ and the completion queue CQ.

Command information I3 stored in the submission queue SQ includes the operation code 17, the data length 18, the host address 19, and the memory address 20 but does not include the command ID 16.

The controller 96 holds location information (for example, an address, a sequential number corresponding to a management unit of the submission queue SQ, or an index) P1 of the command information I3 in the submission queue SQ at time of reading the command information I3, and writes the location information to an internal memory 134 of the controller 96.

The controller 96 reads the command information I3 from a location designated by an SQ head SQH of the submission queue SQ.

The controller 96 uses location information P1 of the command information I3 in the submission queue SQ as information for designating the command information I3 instead of the command ID 16. The controller 96 generates completion information 97 by using the location information P1 of the command information I3 in the submission queue SQ as the command ID after execution of the command, and writes the completion information 97 including the location information P1 and the status information 22 to the internal memory 134 of the controller 96. Then, the controller 96 writes the completion information 97 to a location designated by a CQ tail CQT of the completion queue CQ.

In the above-described embodiment 3-B, since the command ID 16 can be deleted in the command information I3 stored in the submission queue SQ, a data size of the command information I3 can be reduced, and a use amount of the cache memory 94 can be reduced.

Incidentally, in the embodiment 3-B, the controller 96 may execute calculation, based on the location information P1, and the completion information 97 may include a calculation result instead of the location information P1.

Embodiment 3-C

An embodiment 3-C is a modified example of the embodiment 3-A or 3-B. The modified example of the embodiment 3-B will be hereinafter described but the embodiment 3-C can also be applied to the embodiment 3-A. In the embodiment 3-C, the host address 19 is deleted in command information stored in the submission queue SQ.

FIG. 25 is a block diagram illustrating an example of a configuration of a storage system 1H according to the embodiment 3-C.

The storage system 1H includes a processor 98, a cache memory 99, and a memory system 100. The memory system 100 includes a controller 104 and the nonvolatile memories 8.

A part of the cache memory 99 is used as, for example, a data buffer memory 101 which stores the data 28 related to a command such as read data transferred from the memory system 100 or write data to be transferred to the memory system 100. Incidentally, the cache memory 99 and the data buffer memory 101 may be configured separately from each other.

The data 28 related to the command is arranged based on location information P1 of command information I4 in the submission queue SQ, a base address 102, and a stride 103. A location of the data 28 stored in the data buffer memory 101 may be calculated based on a function using, for example, the location information P1, the base address 102, and the stride 103 as arguments.

For example, the processor 98 determines the base address 102 and the stride 103 used when the data 28 is stored in the data buffer memory 101, and notifies the controller 104 of the base address 102 and the stride 103 in advance (for example, during a period after the storage system 1H starts up and until a command is issued, before the data buffer memory 101 is used, or before the data 28 is written to the data buffer memory 101).

The controller 104 writes the base address 102 and the stride 103 to an internal memory 105 of the controller 104.

The processor 98 writes the command information I4 to a location designated by an SQ tail SQT of the submission queue SQ.

In the embodiment 3-C, the command information I4 includes the operation code 17, the data length 18, and the memory address 20 but does not include the command ID 16 and the host address 19.

The controller 104 holds the location information P1 of the command information I4 in the submission queue SQ at time of reading the command information I4, and writes the location information P1 to the internal memory 105 of the controller 104.

The controller 104 reads the command information 14 from the location designated by the SQ head SQH of the submission queue SQ and writes the command information I4 to the internal memory 105 of the controller 104.

The controller 104 calculates an address AD of the data 28, based on the base address 102, the location information P1, and the stride 103. More specifically, for example, the controller 104 calculates base address 102+(location information P1×stride 103) to obtain the address AD of the data 28.

The controller 104 executes the command based on the command information I4 and the address AD. For example, when the command is a read command, the controller 104 reads the data 28 from the nonvolatile memories 8 and writes the data 28 to a location of the data buffer memory 101 designated by the address AD. For example, when the command is write data, the controller 104 reads the data 28 from the location of the data buffer memory 101 designated by the address AD and writes the data 28 to the nonvolatile memories 8.

In the embodiment 3-C described above, the address AD of the data 28 related to the command is calculated based on the base address 102, the location information P1, and the stride 103. The controller 104 writes the data 28 to the location designated by the address AD or reads the data 28 from the location designated by the address AD. In the embodiment 3-C, since the host address 19 can be deleted in the command information I4 stored in the submission queue SQ, a data size of the command information I4 can be reduced and a use amount of the cache memory 99 can be reduced.

Incidentally, in the embodiment 3-C, various types of the above-described aspects can be applied to completion control. The completion control may be executed by using, for example, the completion queue CQ. The completion control may be executed by using, for example, the areas E1 to En determined from the command information or a location of a management unit of the submission queue SQ.

Embodiment 3-D

In the embodiment 3-D, the host address 19 can be deleted in the command information. The embodiment 3-D can be applied in combination with the embodiments 1-A to 3-B.

Figure 26:
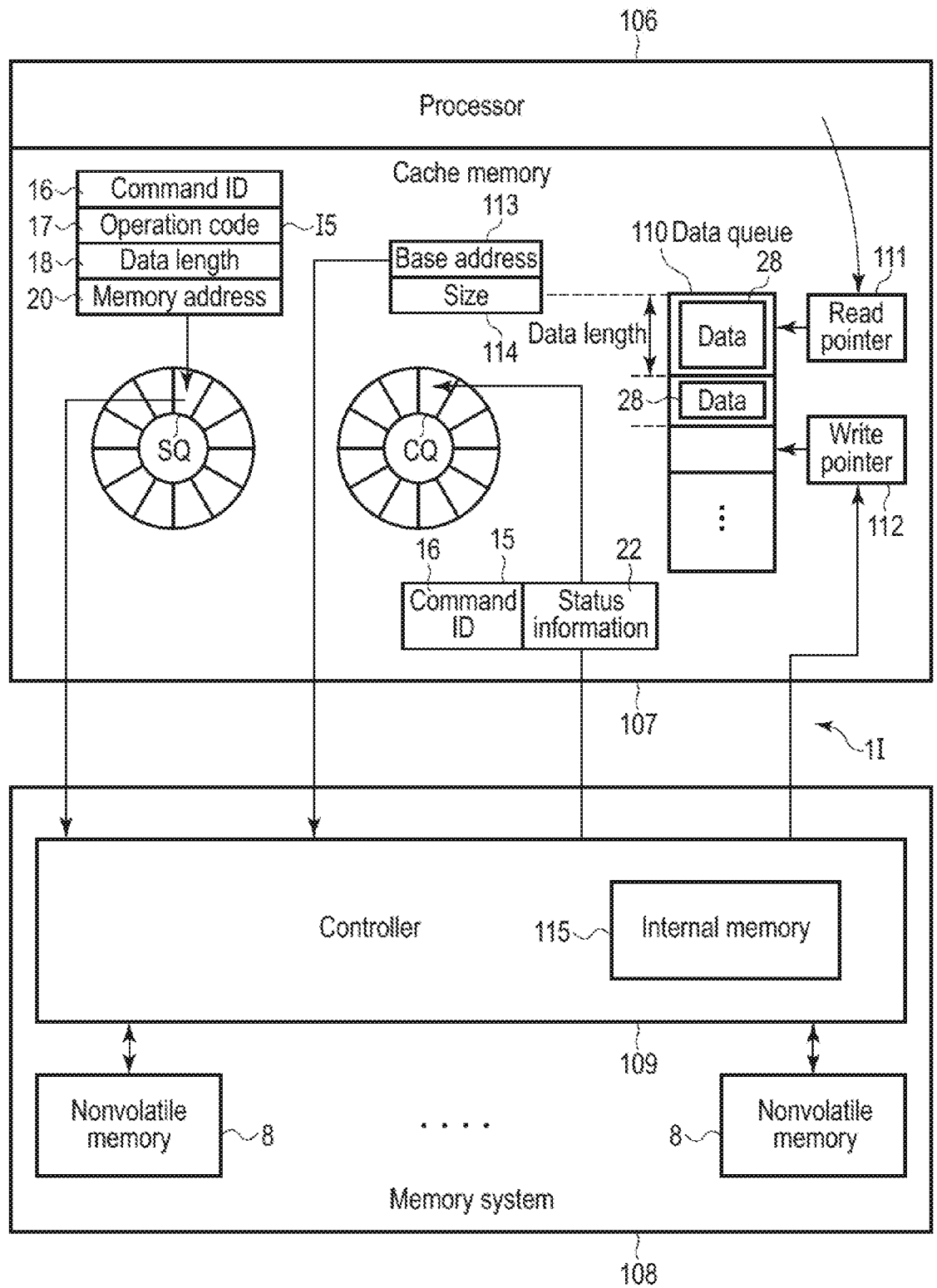
FIG. 26 is a block diagram illustrating an example of a configuration of a storage system according to an embodiment 3-D.

FIG. 26 is a block diagram illustrating an example of a configuration of a storage system 1I according to the embodiment 3-D.

The storage system 1I includes a processor 106, a cache memory 107, and a memory system 108. The memory system 108 includes a controller 109 and the nonvolatile memories 8.

FIG. 26 illustrates an example in which a command is a read command but the same configuration can also be applied to a case where the command is, for example, a write command or the like.

The cache memory 107 according to the embodiment 3-D includes the submission queue SQ, the completion queue CQ, and a data queue 110. In the data queue 110, the data 28 related to the command is stored.

Writing the data 28 related to the command to the data queue 110 and reading the data 28 from the data queue 110 are executed in a first-in first-out method.

To implement the first-in first-out method, the processor 106 and the controller 109 manages a read pointer 111 designating a location which is to be next read in the data queue 110 and a write pointer 112 designating a location which is to be next written in the data queue 110.

For example, the processor 106 determines a base address 113 and a size 114 of the data queue 110 used when the data 28 is stored in the data buffer memory 110, and notifies the controller 109 of the base address 113 and the size 114 of the data queue 110 in advance (for example, during a period after the storage system 1I starts up and until a command is issued, before the data queue 110 is used, or before the data 28 is written to the data queue 110).

The controller 109 writes the base address 113 and the size 114 of the data queue 110, to an internal memory 115 of the controller 109.

The processor 106 writes command information I5 to a location of the submission queue SQ designated by the SQ tail SQT.

The command information I5 includes the command ID 16, the operation code 17, the data length 18, and the memory address 20 but does not include the host address 19.

The controller 109 reads the command information I5 from the location of the submission queue SQ designated by the SQ head SQH, and stores the command information to the internal memory 115 of the controller 109.

The controller 109 executes the command based on the command information I5, and the location of the data queue 110 designated by the write pointer 112.

The controller 109 writes the data 28 read from the nonvolatile memories 8 to the location designated by the write pointer 112, by executing the command. When the data 28 are written to the location designated by the write pointer 112, the controller 109 updates the write pointer 112. More specifically, the controller 109 updates a value of the write pointer 112 by summing a value of the write pointer 112 and the data length 18 of the data 28 stored at the location designated by the write pointer 112. When the updated write pointer 112 designates a range outside a range of the data queue 110, the controller 109 returns the write pointer 112 to the base address 113 again.

The controller 109 generates the completion information I5 including the command ID 16 and the status information 22, and writes the completion information 15 to a location of the completion queue CQ designated by the CQ tail CQT.

The processor 106 reads the data 28 from the location designated by the read pointer 111. After that, the processor 106 updates a value of the read pointer 111 by summing a value of the read pointer 111 and the data length 18 of the data 28 stored at the location designated by the read pointer 111. When the updated write pointer 111 designates a range outside a range of the data queue 110, the controller 106 returns the read pointer 111 to the base address 113 again.

In the embodiment 3-D described above, when a next command is executed subsequently to a previous command, data related to the next command is allocated to a tail of data related to the previous command. The controller 109 writes the data 28 to the location designated by the write pointer 112 in the data queue 110.

In the embodiment 3-D, since the host address 19 can be deleted in the command information I5 stored in the submission queue SQ, a data size of the command information I5 can be reduced and a use amount of the cache memory 107 can be reduced.

Incidentally, in the embodiment 3-D, completion control can be modified to various aspects described above and, for example, the completion control may be executed by using dedicated areas E1 to En.

In the embodiment 3-D, the completion queue CQ may be incorporated into the data queue 110.

A pointer for designating a corresponding data location may be included in a field in an entry of the completion queue CQ. The processor 106 or the controller 109 may acquire the pointer from the field.

In the embodiment 3-D, an example in which the processor 106 issues a read command has been described, however, the data queue 110 can also be applied to a case where the processor 106 issues a write command. When the processor 106 issues the write command, the read pointer 111 of the data queue 110 where the write data are stored is managed by the controller 109, and the write pointer 112 is managed by the processor 106. The processor 106 writes the data 28 to the location designated by the write pointer 112 in the data queue 110, and the controller 109 reads the data 28 from the location designated by the read pointer 111 in the data queue 110, and writes the data 28 to the nonvolatile memories 8.

Embodiment 3-E

A combination of the above-described embodiments 3-A and 3-C will be described in an embodiment 3-E.

FIG. 27 is a block diagram illustrating an example of a configuration of a storage system 1J according to the embodiment 3-E.

The storage system 1J includes a processor 116, a cache memory 117, and a memory system 118. The memory system 118 includes a controller 119 and the nonvolatile memories 8.

The cache memory 117 includes the submission queues SQ1 and SQ2, a completion queue CQ, and the data buffer memory 101.

Control on the submission queue SQ1 will be mainly described below but control on the submission queue SQ2 will be executed in the same manner.

For example, the processor 116 determines the base address 102 and the stride 103 used when the data 28 are stored in the data buffer memory 101, and notifies the controller 119 of the base address 102 and the stride 103 in advance (for example, during a period after the storage system 1J starts up and until a command is issued, before the data buffer memory 101 is used, or before the data 28 is written to the data buffer memory 101).

In addition, the processor 116 sets the operation code OP1 and the data length DL1 for the submission queue SQ1, and notifies the controller 119 of information 133A designating that the operation code OP1 and the data length DL1 are set for the submission queue SQ1.

The controller 119 writes the information 133A designating that the operation code OP1 and the data length DL1 are set for the base address 102, the stride 103, and the submission queue SQ1, to an internal memory 120 of the controller 119.

Command information 16 stored in the submission queue SQ1 includes the command ID 16 and the memory address 20 but does not include the operation code 17, the data length 18, and the host address 19.

When issuing a command corresponding to the operation code OP1 and the data length DL1, the processor 116 writes the command information I6 to a location designated by an SQ tail SQT of the submission queue SQ1. In the embodiment 3-E, the command information 16 is assumed to be written to the submission queue SQ1 by one instruction or one extended instruction of the processor 116.

The controller 119 holds the location information P1 at time of reading the command information I6, and writes the location information P1 to the internal memory 120 of the controller 119. In addition, the controller 119 reads the command information I6 from a location designated by the SQ head SQH of the submission queue SQ1 and writes the command information I6 to the internal memory 120 of the controller 119.

The controller 119 calculates the address AD of the data 28, based on the base address 102, the location information P1, and the stride 103, and writes the address AD to the internal memory 120 of the controller 119.

The controller 119 executes a command based on the command information 16, the operation code OP1, the data length DL1, and the address AD. For example, when the command is a read command, the controller 119 reads the data 28 from the nonvolatile memories 8 and writes the data 28 to a location designated by the address AD of the data buffer memory 101. For example, when the command is a write command, the controller 119 reads the data 28 from the location designated by the address AD of the data buffer memory 101 and writes the data 28 to the nonvolatile memories 8.

The controller 119 generates the completion information 15 and transfers the completion information 15 to a location designated by the CQ tail CQT of the completion queue CQ.

The processor 116 reads the completion information 15 from the location designated by the CQ head CQH of the completion queue CQ. In addition, when the command is a read command, the processor 116 calculates the address AD of the data 28 based on the base address 102, the stride 103, and the location information P1, and reads the data 28 from the location designated by the address AD of the data buffer memory 101.

In the above-described embodiment 3-E, the same advantages as those of the above-described embodiments 3-A and 3-C can be obtained. More specifically, in the embodiment 3-E, the operation code 17, the data length 18, and the host address 19 can be deleted in the command information I6, a data size of the command information I6 can be reduced, a use amount of the cache memory 117 can be reduced, and a process load of the processor 116 can be reduced.

In the embodiment 3-E, for example, when the processor 116 is a 64 bits machine, and when a data size of the command information I6 is 64 bits or 128 bits, the processor 116 can write the command information I6 to the submission queue SQ1 by one store instruction of 64 bits or one extended instruction. A processing efficiency of the processor 116 can be therefore improved.

Embodiment 3-F

An embodiment 3-F is a modified example of the embodiment 3-E. The embodiment 3-F corresponds to a combination of the above-described embodiments 3-A, 3-C, and 2-A.

FIG. 28 is a block diagram illustrating an example of a configuration of a storage system 1K according to the embodiment 3-F.

In the embodiment 3-F, the command information I6 includes the command ID 16 and the memory address 20 but does not include the operation code 17, the data length 18, and the host address 19. Incidentally, in the embodiment 3-F, the command information I6 may not include the command ID 16.

The storage system 1K includes a processor 121, a cache memory 122, and a memory system 123. The memory system 123 includes a controller 124 and the nonvolatile memories 8.

The cache memory 122 includes the submission queues SQ1 and SQ2, the areas E1 to En, and the data buffer memory 101.

Control on the submission queue SQ1 will be mainly described below but control on the submission queue SQ2 will be executed in the same manner.

For example, the processor 121 determines the base address 102 of the data buffer memory 101 and the stride 103, and notifies the controller 124 of the base address 102 and the stride 103 in advance (for example, during a period after the storage system 1K starts up and until a command is issued, before the data buffer memory 101 is used, or before the data 28 is written to the data buffer memory 101).

In addition, the processor 121 sets the operation code OP1 and the data length DL1 for the submission queue SQ1, and notifies the controller 124 of information 133A designating that the operation code OP1 and the data length DL1 are set for the submission queue SQ1 in advance (for example, during a period after the storage system 1K starts up and until a command is issued, before the submission queue SQ1 is used, or before command information is written to the submission queue SQ1).

Furthermore, the processor 121 determines, acquires, or calculates addresses which are uniquely determined based on the command information I6 stored in the submission queue SQ1 and which designating locations used as the areas E1 to En, and prepares or allocates the areas E1 to En.

The controller 124 writes the base address 102, the stride 103, and the information 133A designating that the operation code OP1 and the data length DL1 are set for the submission queue SQ1, to the internal memory 125 of the controller 124.

When issuing a command corresponding to the operation code OP1 and the data length DL1, the processor 121 writes the command information I6 to the location designated by the SQ tail SQT of the submission queue SQ1.

The controller 124 holds the location information P1 at time of reading the command information I6, and writes the location information P1 to the internal memory 125 of the controller 124. In addition, the controller 124 reads the command information I6 from the location designated by the SQ head SQH of the submission queue SQ1, and writes the command information I6 to the internal memory 125 of the controller 124.

The controller 124 calculates the address AD of the data 28, based on the base address 102, the location information P1, and the stride 103.

Furthermore, the controller 124 calculates the completion address 57 designating the area E1 which is to be the write destination of the completion information 53 after executing a command corresponding to the command information I6, and writes the completion address 57 to the internal memory 125 of the controller 124.

The controller 124 executes the command, based on the command information I6, the information 133A designating that the operation code OP1 and the data length DL1 are set for the submission queue SQ1, and the address AD. For example, when the command is a read command, the controller 124 reads the data 28 from the nonvolatile memories 8, and writes the data 28 to the location designated by the address AD of the data buffer memory 101. For example, when the command is a write command, the controller 124 reads the data 28 from the location designated by the address AD of the data buffer memory 101, and writes the data 28 to the nonvolatile memories 8.

The controller 124 generates the completion information 53, and writes the completion information 53 to the area E1 designated by the completion address 57 stored in the internal memory 125 of the controller 124.

The processor 121 reads the completion information 53 from the area E1 determined based on the command information I6 stored in the submission queue SQ1, calculates the address AD of the data 28 based on the base address 102, the stride 103, and the location information P1, and reads the data 28 from a location designated by the address AD.

In the above-described embodiment 3-F, the same advantages as those of the above-described embodiments 2-A and 3-C can be obtained. More specifically, in the embodiment 3-F, a data size of the command information I6 can be reduced. In addition, in the embodiment 3-F, completion control can be reduced since the completion queue CQ is not used. Thus, in the embodiment 3-F, a use amount of the cache memory 122 can be reduced and a process load of the processor 121 can be reduced.

Embodiment 3-G

Implementing the above-described embodiments 1-A to 3-F by a key value method will be described in an embodiment 3-G.

An example of applying the key value method to the embodiment 3-D will be described in the embodiment 3-G. Similarly, however, the key value method can also be applied to the embodiments 1-A to 3-C, 3-E, and 3-F.

In the embodiment 3-G, a command information includes a key, and a value (read data) corresponding to the key is stored in a data queue of a cache memory.

FIG. 29 is a block diagram illustrating an example of a configuration of a storage system 1L according to the embodiment 3-G.

The storage system 1L includes a processor 126, a cache memory 127, and a memory system 128. The memory system 128 includes a controller 129 and the nonvolatile memories 8.

FIG. 29 illustrates an example in which a command is a read command but the same configuration can also be applied to a case where the command is, for example, a write command or the like.

A data size of each value V corresponding to each key K is variable.

The cache memory 127 includes the submission queues SQ1 and SQ2, the completion queue CQ, and the data queue 110.

The submission queue SQ1 is associated with the operation code OP1 designating the read command.

The data queue 110 stores the value V which is read by the controller 129. Writing the value V to the data queue 110 and reading the value from the data queue 110 are executed by a first-in first-out method.

The write pointer 112 designates a location where the value V is to be next written. The controller 129 reads the value V corresponding to the key K from the nonvolatile memories 8, and writes the value V to a location designated by the write pointer 112. When the value V is written to the location designated by the write pointer 112, the controller 129 sums a value of the write pointer 112 and a data length 130 of the value V and updates the value of the write pointer 112.

The read pointer 111 designates a location where the value V is to be next read. The processor 126 reads the value V from the location designated by the read pointer 111. When reading the value V from the location designated by the read pointer 111, the processor 126 sums a value of the read pointer 111 and the data length 130 of the value V and updates the value of the read pointer 111.

In the embodiment 3-G, an example in which the controller 129 manages the write pointer 112 and the processor 126 manages the read pointer 111 has been described. However, the processor 126 may manage the write pointer 112 and the controller 129 may manage the read pointer 111.

In the embodiment 3-G, command information I7 stored in the submission queue SQ1 includes the command ID 16 and the key K but does not include, for example, the operation code 17, the data length 18, the host address 19, the memory address 20, and the like. In addition, the command information I7 may not include a length of the key.

Completion information 131 stored in the completion queue CQ includes the command ID, the status information 22, and the data length 130 of the value V.

The processor 126 sets the operation code OP1 designating the read command for the submission queue SQ1, and notifies the controller 129 of information 133C designating that the operation code OP1 is set for the submission queue SQ1 in advance (for example, during a period after the storage system 1L starts up and until a command is issued, before the submission queue SQ1 is used, or before command information is written to the submission queue SQ1).

The controller 129 writes the information 133C designating that the operation code OP1 is set for the submission queue SQ1, to an internal memory 132 of the controller 129.

When the read command is issued, the processor 126 writes the command information I7 to the location of the submission queue SQ1 designated by the SQ tail SQT. In the embodiment 3-G, the command information I7 is assumed to be written to the submission queue SQ by one instruction or one extended instruction of the processor 126.

The controller 129 reads the command information I7 from the location designated by the SQ head SQH of the submission queue SQ1 and writes the command information I7 to the internal memory 132 of the controller 129.

The controller 129 executes a command, based on the command information I7 and the information 133C designating that the operation code OP1 is set for the submission queue SQ1, reads the value V corresponding to the key K from the nonvolatile memories 8, and writes the value V to the location of the data queue 110 designated by the write pointer 112.

The controller 129 adds the data length 130 of the value V to the value of the write pointer 112 and updates the value of the write pointer 112.

The controller 129 generates the completion information 131 and writes the completion information 131 to the location of the completion queue CQ designated by the CQ tail CQT.

The processor 126 reads the completion information 131 from the location of the completion queue CQ designated by the CQ head CQH.

The processor 126 reads the value V having the data length 130 included in the completion information 131, from the location of the data queue 110 designated by the read pointer 111.

Furthermore, the processor 126 adds the data length 130 of the read value V included in the completion information 131 to the value of the read pointer 111 and updates the value of the read pointer 111.

In the above-described embodiment 3-G, the same advantages as those of each of the above-described embodiments can be obtained by appropriately combining the methods according to the respective embodiments, in the storage system 1L of the key value method. More specifically, in the embodiment 3-G, a data size of the command I7 can be reduced, a use amount of the cache memory 127 can be reduced, control on the submission queue SQ and completion control can be simplified, and a process efficiency of the processor 126 can be improved.

In the embodiment 3-G, similarly to the above-described embodiment 3-F, the data size of the command information I7 may be smaller than or equal to one data size handled by the instruction or one data size handled by the extended instruction of the processor 126 to improve a process efficiency of the processor 126.

In the above-described embodiments 3-C to 3-G, a location where the data 28 or the value V is written for the data buffer memory 101 or the data queue 110, i.e., an address may be determined in other methods.

For example, the address of the data buffer memory 101 or the data queue 110 may be calculated based on a value constituting command information, a location of the command information in the submission queue SQ, a value preset on a side of memory system, and a value which the memory system holds as a result of having previously processed a request.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory; and
   a controller configured to be connectable with a host and control the nonvolatile memory, wherein
   the controller is configured to:
   receive update frequency information of a submission queue from the host;

read command information stored in the submission queue based on the received update frequency information; and execute controlling for the nonvolatile memory based on the command information.

2. The memory system of claim 1, wherein the update frequency information includes at least one of an estimated number of updates of the submission queue or an update number per unit time.

3. The memory system of claim 1, wherein the controller is configured to read a set including a plural number of the command information stored in the submission queue.

4. The memory system of claim 1, wherein the command information includes update information designating whether updating is executed or not.

5. The memory system of claim 4, wherein
the submission queue is a ring buffer,
a status of the update information designating that the updating is executed is inverted based on a lap of the ring buffer, and
the controller is configured to invert a determination criterion on whether the update information is updated or not, based on the lap of the ring buffer.

6. The memory system of claim 4, wherein the controller is configured to execute the controlling, based on the command information, when it is designated that the update information is updated, and is configured discard the command information when it is designated that the update information is not updated.

7. A memory system comprising:
a nonvolatile memory; and
a controller configured to be connectable with a host and control the nonvolatile memory, wherein
the controller is configured to:
read command information stored in a submission queue of the host;
control the nonvolatile memory based on the command information;
determine an address from the command information; and
write completion information for the command information, to a memory of the host, based on the address determined from the command information, the memory of the host being different from a completion queue.

8. The memory system of claim 7, wherein the controller is configured to write the completion information into one management unit including the command information in the memory.

9. The memory system of claim 7, wherein the controller is configured to write a plural number of the completion information into one management unit in the memory.

10. The memory system of claim 7, wherein
the command information includes the address, and
the controller is configured to write the completion information to the memory, based on the address in the command information.

11. The memory system of claim 7, wherein the controller is configured to write read data read from the nonvolatile memory based on the command information, and the completion information, into one management unit in the memory.

12. The memory system of claim 7, wherein the controller is configured to receive a base address and a stride from the host, and is configured to calculate the address, based on an index allocated to each management unit of the submission queue, the base address, and the stride.

13. A memory system comprising:
a nonvolatile memory; and
a controller configured to be connectable with a host and control the nonvolatile memory, wherein
the controller is configured to:
receive first information from the host before reading of second information, the first information being set for a submission queue and corresponding to a first part of a command;
read the second information from the submission queue, the second information corresponding to a second part of the command, the second information being different from the first information; and
execute the command including the first information and the second information to control the nonvolatile memory.

14. The memory system of claim 13, wherein a size of the second information is any value within a range of larger than or equal to 32 bits and smaller than or equal to 128 bits.

15. A memory system comprising:
a nonvolatile memory; and
a controller configured to be connectable with a host and control the nonvolatile memory, wherein
the controller is configured to:
receive first information from the host before reading of second information, the first information designating that at least one of an operation code or a data length is set for a submission queue of the host;
read the second information from the submission queue, the second information being information in which at least one of the operation code or the data length designated by the first information is excluded from a command; and
execute the command including the at least one of the operation code or the data length designated by the first information and the second information to control the nonvolatile memory.

16. The memory system of claim 15, wherein a size of the second information is any value within a range of larger than or equal to 32 bits and smaller than or equal to 128 bits.

17. A memory system comprising:
a nonvolatile memory; and
a controller configured to be connectable with a host and control the nonvolatile memory, wherein
the controller is configured to:
read command information which is stored in a submission queue of the host and does not include a command ID;
receive location information of the command information in the submission queue from the host at time of reading the command information;
write the received location information to a memory of the controller;
control the nonvolatile memory based on the command information; and
write completion information which does not include the command ID and includes the location information of the command information in the submission queue, to a memory of the host.

18. A method of controlling a nonvolatile memory, the method comprising:
receiving update frequency information of a submission queue from a host;
reading command information stored in the submission queue based on the received update frequency information; and controlling the nonvolatile memory based on the command information.

19. A method of controlling a nonvolatile memory, the method comprising:
  receiving first information from a host, the first information being set for a submission queue and corresponding to a first part of a command;
  reading second information from the submission queue, the second information corresponding to a second part of the command, the second information being different from the first information; and
  executing the command including the first information and the second information to control the nonvolatile memory.

* * * * *